United States Patent
Miyaji et al.

(10) Patent No.: US 9,400,133 B2
(45) Date of Patent: Jul. 26, 2016

(54) VACUUM INSULATION MATERIAL AND HEAT INSULATION HOUSING USING THE SAME

(71) Applicant: Panasonic Corporation, Kadoma-shi, Osaka (JP)

(72) Inventors: Noriyuki Miyaji, Shiga (JP); Shinya Kojima, Kyoto (JP); Kenta Miyamoto, Shiga (JP); Kazuhiro Kawanishi, Shiga (JP); Naoki Yamamoto, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 5 days.

(21) Appl. No.: 14/387,088

(22) PCT Filed: Mar. 22, 2013

(86) PCT No.: PCT/JP2013/001952
§ 371 (c)(1),
(2) Date: Sep. 22, 2014

(87) PCT Pub. No.: WO2013/140816
PCT Pub. Date: Sep. 26, 2013

(65) Prior Publication Data
US 2015/0044412 A1     Feb. 12, 2015

(30) Foreign Application Priority Data

Mar. 23, 2012 (JP) ................. 2012-066600
Mar. 23, 2012 (JP) ................. 2012-066601

(51) Int. Cl.
*F16L 59/065* (2006.01)
*F25D 23/06* (2006.01)

(52) U.S. Cl.
CPC .......... *F25D 23/065* (2013.01); *F25D 2201/14* (2013.01); *Y10T 428/231* (2015.01)

(58) Field of Classification Search
CPC ... Y10T 428/231; F16L 59/065; E04B 1/803; Y02B 80/12; F25D 2201/14
USPC .......................................................... 428/69
See application file for complete search history.

(56) References Cited

U.S. PATENT DOCUMENTS 4,349,051 A    9/1982   Schilf
4,417,382 A   11/1983   Schilf
(Continued)

FOREIGN PATENT DOCUMENTS

CN     101072968     7/1989
EP       0017095     10/1980
(Continued)

OTHER PUBLICATIONS

Chinese Office Action, Jul. 3, 2015; Chinese Patent Application No. 201380016039.6, with English translation (12 pages).
Extended European Search Report Feb. 5, 2015; EP Application No. 13764071.0 (5 pages).

*Primary Examiner* — Alexander Thomas
(74) *Attorney, Agent, or Firm* — Hamre, Schumann, Mueller & Larson, P.C.

(57) ABSTRACT

A vacuum insulation material includes: a core member having a large number of minute spaces; a cover member having an internal space in which the core member is housed, the internal pressure being decompression-sealed; and an inspection member provided between the core member and the cover member. The inspection member includes a retaining portion disposed on the core member and a hole formed in the retaining portion.

14 Claims, 16 Drawing Sheets

(56) References Cited

U.S. PATENT DOCUMENTS

| | | |
|---|---|---|
| 4,709,578 A | 12/1987 | Iwasaki et al. |
| 5,505,810 A | 4/1996 | Kirby et al. |
| 5,532,034 A | 7/1996 | Kirby et al. |
| 7,641,298 B2 * | 1/2010 | Hirath ............... F24C 15/08 312/401 |
| 2004/0058119 A1 * | 3/2004 | Wynne ............... B29C 53/063 428/69 |
| 2006/0088685 A1 | 4/2006 | Echigoya et al. |
| 2009/0186176 A1 | 7/2009 | Yamada et al. |
| 2011/0030892 A1 | 2/2011 | Yamada et al. |

FOREIGN PATENT DOCUMENTS

| | | |
|---|---|---|
| EP | 1647759 | 4/2006 |
| JP | 59-186777 U | 12/1984 |
| JP | 61-107126 | 5/1986 |
| JP | 62-141188 U | 9/1987 |
| JP | 9-166510 | 6/1997 |
| JP | 2007-283989 | 11/2007 |
| JP | 2012-051647 | 3/2012 |

* cited by examiner

LENGTH DIRECTION
WIDTH DIRECTION

THICKNESS DIRECTION
WIDTH DIRECTION

VACUUM INSULATION MATERIAL AND HEAT INSULATION HOUSING USING THE SAME

TECHNICAL FIELD

The present invention relates to a vacuum insulation material and a heat insulation housing and particularly to a vacuum insulation material, in which an inside of a cover member covering a core member is decompression-sealed, and a heat insulation housing the same.

BACKGROUND ART

In recent years, as measures against global warming which is a global environmental problem, movement for promoting energy conservation is becoming vigorous. In these circumstances, from the viewpoint of energy conservation by effective utilization of heat, a vacuum insulation material excellent in heat insulation performance is required of an apparatus utilizing hot and cold heat. For example, the vacuum insulation material is formed by decompression-sealing a core member made of glass wool or the like in a cover member which is formed into a bag shape and has a gas barrier property.

In general, a heat conductivity of a heat insulation material is measured by a guarded hot plate method (GHP method) or a heat flow meter method (HFM method) shown in JIS A1412-1 or JIS A1412-2. However, in the vacuum insulation material, a void size of the core member is smaller than a mean free path of gas molecules under reduced pressure and therefore heat conduction by gas is small. Moreover, if the void size of the core member is as small as about 1 mm, heat transfer by convection can be ignored. Furthermore, heat transfer by radiation is small at room temperature. Consequently, heat conduction by the core member and heat conduction by a small amount of remaining gas are dominant in the heat transfer in the vacuum insulation member and therefore a heat conductivity of the vacuum insulation material is much smaller than those of other types of heat insulation material. Therefore, there is the problem that it takes time to measure the heat conductivity of the vacuum insulation material.

To solve this problem, there is a known method in which heat insulation performance (heat conductivity) of a vacuum insulation material is evaluated by measuring the degree of vacuum, because the heat conductivity of the vacuum insulation material depends on the internal pressure (degree of vacuum) of the vacuum insulation material. For example, in a vacuum degree measuring device in Patent Document 1, when a vacuum insulation material is set in a vacuum chamber and the pressure in the vacuum chamber is reduced, wrapping material of the vacuum insulation material inflates. This displacement of the wrapping material is sensed by a displacement sensor and the internal pressure of the chamber at this time is calculated as the degree of vacuum of the heat insulation material.

In an internal pressure measuring device in Patent Document 2, when an opening portion of a measuring chamber provided in a vacuum pad is brought in close contact with a thin film of a sealed container and the pressure of the measuring chamber is reduced, the thin film of the sealed container inflates. This deformation is detected by a detector and pressure in the measuring chamber at this time is measured as the internal pressure of the sealed container.

CITATION LIST

Patent Literature

PTL 1: Japanese Patent Application Laid-Open No. 61-107126
PTL 2: Japanese Patent Application Laid-Open No. 09-166510

SUMMARY OF INVENTION

Technical Problem

In the vacuum degree measuring device in Patent Document 1, the pressure of the entire vacuum insulation material is reduced in the vacuum chamber. In this way, if the degree of vacuum of the vacuum insulation material using glass wool or silica powder, which is not formed, as a core material is measured, the core member expands. Then, after the measurement, if the air is introduced into the vacuum chamber, pressure applied to the core member increases and the core member tries to be restored to an original state. However, it is difficult for the core member to be restored to the original state uniformly in a width direction, a length direction, and a thickness direction and therefore the vacuum insulation material is likely to be deformed or wrinkled.

Moreover, in the vacuum insulation material in which the core member is compressed in the thickness direction after vacuum-packed, if the vacuum chamber is opened to the air after the measurement of the degree of vacuum, a thickness of the vacuum insulation material is likely to become larger than that before the measurement.

In the internal pressure measuring device in Patent Document 2, a core member in the sealed container is pulled toward the measuring chamber as a result of reduction of the pressure in the measuring chamber which has been brought in close contact with the sealed container. Then, after the air is introduced into the measuring chamber, the core member tries to return, but it is difficult for the core member to completely return to an original position. Therefore, the deformation is likely to remain on the vacuum insulation material and the thin film is likely to be wrinkled due to the deformation.

If the vacuum insulation material the degree of vacuum of which has been measured is stuck to a housing of a refrigerator or the like, the vacuum insulation material cannot come in close contact with the housing due to the wrinkles or the deformation and a clearance is formed between the vacuum insulation material and the housing. Because of the clearance, heat insulating effect of the vacuum insulation material reduces or the vacuum insulation material cannot be fixed to the housing.

With the problems of the above-described pieces of prior art in view, it is an object of the present invention to provide a vacuum insulation material, internal pressure of which can be measured while deformation of a core member is suppressed, and a heat insulation housing the same.

Solution to Problem

A vacuum insulation material according to an aspect of the present invention includes: a core member having a large number of minute spaces; a cover member having an internal space in which the core member is housed, the internal space being decompression-sealed; and an inspection member provided between the core member and the cover member. The inspection member includes a retaining portion disposed on the core member and a hole formed in the retaining portion.

Advantageous Effects of Invention

The invention has the above-described structure and exerts an effect of providing a vacuum insulation material, internal pressure of which can be measured while deformation of a core member is suppressed, and a heat insulation housing the same.

The above and other objects, features, and advantages of the invention will become apparent from the following detailed description of preferred embodiments with reference to the accompanying drawings.

DESCRIPTION OF EMBODIMENTS

Figure 1:
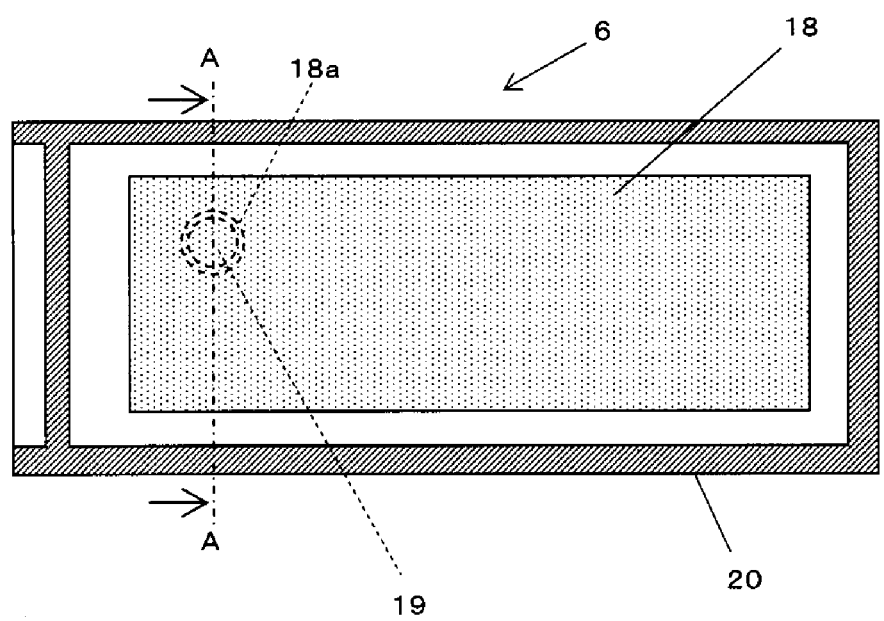
FIG. 1 is a plan view of a vacuum insulation material according to Embodiment 1 of the present invention.

A vacuum insulation material according to a first invention includes: a core member having a large number of minute spaces; a cover member having an internal space in which the core member is housed, the internal space being decompression-sealed; and an inspection member provided between the core member and the cover member. The inspection member includes a retaining portion disposed on the core member and a hole formed in the retaining portion.

In the vacuum insulation material according to a second invention, in addition to the features of the first invention, the inspection member includes a flange portion that protrudes from an upper face of the retaining portion toward the cover member and continuously surrounds a periphery of the hole.

In the vacuum insulation material according to a third invention, in addition to the features of the second invention, the flange portion may be integrally formed with the retaining portion.

In the vacuum insulation material according to a fourth invention, in addition to the features of the second or third invention, the flange portion may have a rectangular or circular shape when seen from a side of the upper face.

In the vacuum insulation material according to a fifth invention, in addition to the features of any one of the first to fourth inventions, the inspection member may further include a protruding portion protruding from a lower face of the retaining portion toward the core member.

In the vacuum insulation material according to a sixth invention, in addition to the features of any one of the second to fifth inventions, the retaining portion may include a tapered portion formed by sloping the upper face of the retaining portion toward an upper face of the flange portion.

In the vacuum insulation material according to a seventh invention, in addition to the features of any one of the first to sixth inventions, the inspection member may have a shape with a smaller dimension in a length direction perpendicular to a thickness direction than a dimension in a width direction perpendicular to the thickness direction and the length direction.

In the vacuum insulation material according to an eighth invention, in addition to the features of any one of the second to seventh inventions, the plurality of holes may be formed in the retaining portion and the plurality of holes may be disposed symmetrically with respect to a center of the flange portion.

In the vacuum insulation material according to a ninth invention, in addition to the features of any one of the first to eighth inventions, the core member may include a recess having a surface lower than a surrounding surface and the inspection member may be fitted in the recess.

In the vacuum insulation material according to a tenth invention, in addition to the features of the ninth invention, the recess may be formed by cutting out or compressing the core member.

In the vacuum insulation material according to an eleventh invention, in addition to the features of the ninth invention, the core member may be a laminated body formed by laminating a plurality of core member layers and the recess may be formed by cutting an upper layer out of the plurality of core member layers.

In the vacuum insulation material according to a twelfth invention, in addition to the features of any one of the first to eleventh inventions, the core member may further include a concave portion which is formed in an opposite face from the face provided with the inspection member.

A heat insulation housing according to a thirteenth invention includes the vacuum insulation material according to any one of the first to twelfth inventions and a wall portion on which the vacuum insulation material is disposed.

In the heat insulation housing according to a fourteenth invention, in addition to the features of the thirteenth invention, the vacuum insulation material may be disposed on the wall portion so that an opposite face from a face provided with the inspection member comes in contact with the wall portion.

In the heat insulation housing according to a fifteenth invention, in addition to the features of the thirteenth or fourteenth invention, at least one of a length and a width of the vacuum insulation material may be smaller than an interval between adjacent pipes disposed on the wall portion.

Embodiments of the invention will be concretely described below with reference to the drawings.

The same or corresponding components are provided with the same reference signs throughout all the drawings and will not be described repeatedly in the following description.

Embodiment 1
(Structure of Vacuum Insulation Material)

Figure 2:
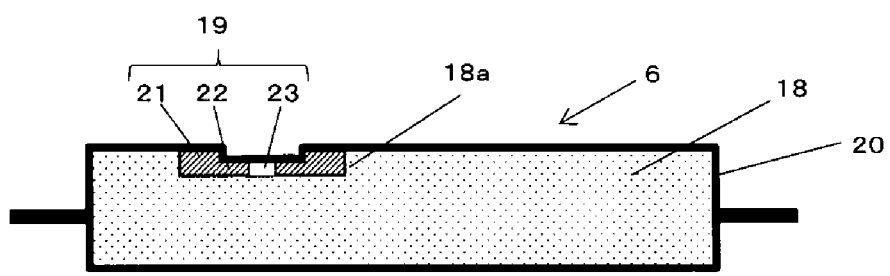
FIG. 2 is a sectional view of the vacuum insulation material cut along line A-A in FIG. 1.

FIG. 1 is a plan view of a vacuum insulation material 6 according to Embodiment 1. FIG. 2 is a sectional view of the vacuum insulation material 6 cut along line A-A in FIG. 1. As shown in FIGS. 1 and 2, the vacuum insulation material 6 is a member for blocking heat transfer and formed by decompression-sealing an inside of a cover member 20 housing a core member 18.

The core member 18 is a member including a large number of minute spaces in itself and is a skeletal member for maintaining an internal space of the cover member 20 the pressure of which is reduced. The core member 18 keeps the internal space of the cover member 20 by supporting the cover member 20. The core member 18 is formed by forming a porous substance, a large number of fibrous materials, a particulate, or the like. Examples of the fibrous material include inorganic fibers such as glass fiber, rock wool, alumina fiber, and metal fiber and resin fibers such as polyethylene terephthalate and polypropylene fiber. Examples of the particulate include powders such as perlite and dry silica. Examples of the porous substance include foams such as polyurethane and polystyrene having connected bubbles. Especially, it is preferable to use a glass fiber in which the fiber itself has high elasticity and the fiber itself has a low heat conductivity and which is industrially inexpensive. The smaller a diameter of the fiber, the more the heat conductivity of the vacuum insulation material 6 tends to reduce. Therefore, it is preferable to use the fiber with a small diameter. However, if the diameter of the fiber is excessively small, cost of the fiber is expected to increase. Therefore, as the fiber of the vacuum insulation material 6, it is more preferable to use glass paper made by using generally used and relatively inexpensive glass wool or glass fiber formed by aggregates with a mean fiber diameter of about 3 μm to 6 μm. The core member 18 has a three-dimensional shape, e.g., a thin substantially rectangular parallelepiped shape, and a recess 18a is formed in an upper face of the core member 18.

The recess 18a is an area in which an inspection member 19 (described later) is housed in the core member 18a and has a shape conforming to the inspection member 19. A surface (bottom face) of the recess 18a is formed to be lower than the surface (upper face) of the core member 18a around the recess 18a. The recess 18a is formed by cutting out or compressing a portion of the core member 18. However, if the core member 18 is formed by using a metal mold or the like, the recess 18a may be formed simultaneously when the core member 18 is formed by using the metal mold provided with a protruding portion corresponding to the recess 18a. A depth of the recess 18a, i.e., a dimension between a bottom face of the recess 18a and an upper face of the core member 18 around the recess 18a is set to be smaller than a thickness of the core member 18.

The cover member 20 is for maintaining the internal pressure of the vacuum insulation material 6 low and is formed by a gas barrier film for blocking entry of water and gas into an internal space. For the cover member 20, a film having no or small stretch property is used. As the film, there may be used a laminated film formed by subjecting to a laminate treatment a sheet in which an innermost layer which is a heat weld film, an intermediate layer which is a gas barrier film, and an outermost layer which is a surface protecting film are laminated. For the innermost layer, there is used a thermoplastic resin film such as a low-density polyethylene film, a linear low-density polyethylene film, a high-density polyethylene film, a polypropylene film, a polyacrylonitrile film, or an ethylene-vinylalcohol copolymer film or a film made of mixed resin thereof, for example. For the intermediate layer, there is used a metal foil such as an aluminum foil or a copper foil or a film formed by vapor-depositing a metal such as aluminum or copper or a metal oxide onto a resin substrate such as a polyethylene terephthalate film, an ethylene-vinylalcohol copolymer film, or a polyvinyl alcohol film, for example. Furthermore, for the outermost layer, there is used a known material such as a nylon film, a polyethylene terephthalate film, or a polypropylene film, for example.

The inspection member 19 is a member for measuring the internal pressure of the vacuum insulation material 6, housed in the internal space of the cover member 20 together with the core member 18, and provided between the core member 18 and the cover member 20.

(Structure of Inspection Member)

Figure 3:
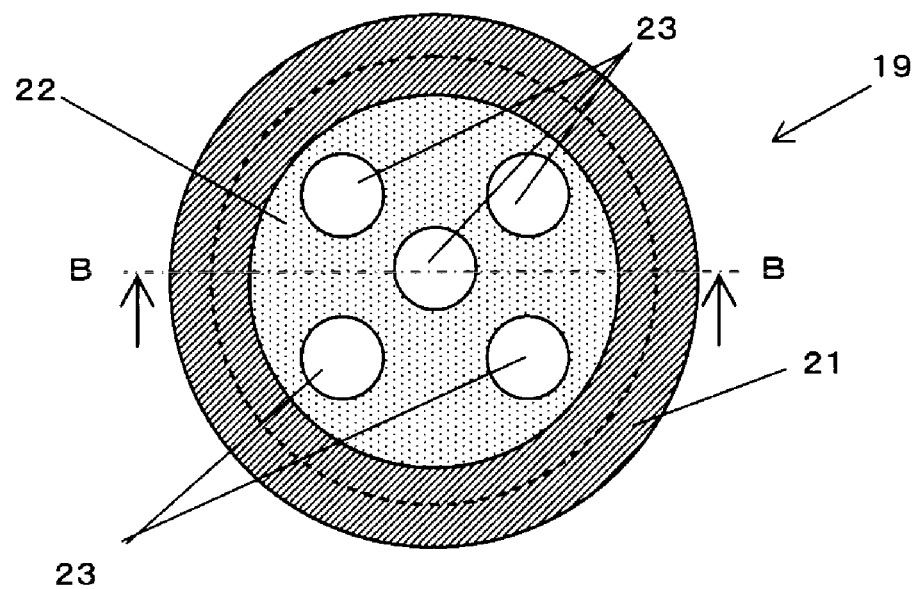
FIG. 3 is a plan view of an inspection member provided to the vacuum insulation material in FIG. 1.
Figure 4:
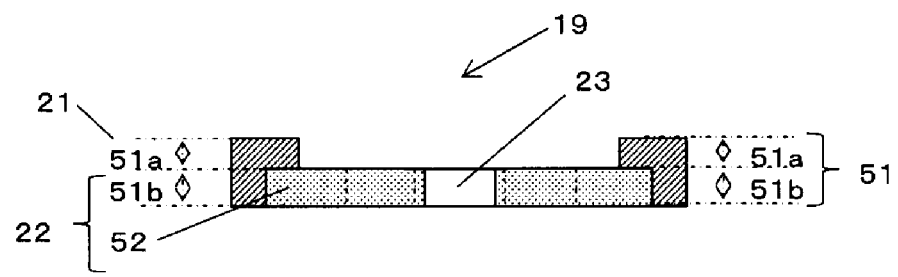
FIG. 4 is a sectional view of the inspection member cut along line B-B in FIG. 3.

FIG. 3 is a plan view of the inspection member 19 provided to the vacuum insulation material 6. FIG. 4 is a sectional view of the inspection member 19 cut along line B-B in FIG. 3. As shown in FIGS. 3 and 4, the inspection member 19 is formed by combining an outer member 51 and an inner member 52, for example. As the outer member 51 and the inner member 52, a material which discharges little gas or water under reduced pressure is preferable. For example, inorganic materials such as aluminum, copper, stainless steel, and ceramic, organic materials such as polypropylene, polyethylene, polyethylene terephthalate, polyacetal, nylon, and polystyrene, fiber-reinforced resins obtained by mixing fibers of these organic materials and inorganic materials, and the like are used. The dimensions of the outer member 51 and the inner member 52 are set so that the outer member 51 and the inner member 52 are not deformed by pressure acting during measurement of the internal pressure of the vacuum insulation material 6.

The inner member 52 is in a thin disc shape and one or a plurality of (five, in the present embodiment) hole(s) 23 is/are formed in the inner member 52.

The outer member 51 is in a thin annular shape and formed by an upper portion 51a and a lower portion 51b having different inside diameters. The inside diameter of the upper portion 51a of the outer member 51 is smaller than the inside diameter of the lower portion 51b. The inside diameter of the lower portion 51b of the outer member 51 is equal to an outside diameter of the inner member 52 and the inner member 52 is fitted inside the lower portion 51b of the outer member 51. A thickness of the lower portion 51b of the outer member 51 is equal to a thickness of the inner member 52 and a lower face of the outer member 51 is flush with a lower face of the inner member 52 fitted in the outer member 51. The upper portion 51a of the outer member 51 is positioned on the inner member 52 fitted in the lower portion 51b of the outer member 51 and protrudes upward from an upper face of the inner member 52. In this way, a step corresponding to a thickness of the upper portion 51a of the outer member 51 is formed between an upper face of the outer member 51 and the upper face of the inner member 52. The inside diameter of the upper portion 51a of the outer member 51 is set so that the upper portion 51a of the outer member 51 does not close the hole(s) 23 in the inner member 52 fitted in the outer member 51.

The inspection member 19 formed by the outer member 51 and the inner member 52 in this manner has a retaining portion 22, the holes 23 provided inside the retaining portion 22, and a flange portion 21 provided on the retaining portion 22.

The retaining portion 22 is the portion for suppressing movement toward the core member 18 during the measurement of the internal pressure of the vacuum insulation material 6, has a thin disc shape, and corresponds to the inner member 52 and the lower portion 51b of the outer member 51. A lower face of the retaining portion 22 corresponds to the lower face of the inner member 52 and a lower face of the lower portion 51b and is in a flat shape. An upper face of the retaining portion 22 is an inner area of the upper face of the inner member 52 surrounded with the upper portion 51a of the outer member 51 and is the area exposed to an outside. The upper face is flat and parallel to the lower face. However, the shape of the upper face is not limited, if the upper face is lower than an upper face of the flange portion 21.

The holes 23 are the portions for transmitting pressure in the core member 18, i.e., the internal pressure of the vacuum insulation material 6 to the cover member 20 during the measurement of the internal pressure of the vacuum insulation material 6 and pass through the retaining portion 22 in a thickness direction. The holes 23 are formed by boring the inner member 52 or by using the inner member 52 formed by punching metal or metal mesh, for example. Shapes and dimensions of the five holes 23 are the same. However, the shapes and the dimensions of the five holes 23 may not be the same, if the shapes, the dimensions, and areas of the five holes 23 are point-symmetric or line-symmetric with respect to a center of the flange portion 21.

The flange portion 21 is the portion for securing close contact between a vacuum pad (described later) and the cover member 20 during the measurement of the internal pressure of the vacuum insulation material 6. The flange portion 21 is provided along an end of the retaining portion 22 in such a manner as to continuously surround the holes 23, has a circular annular section, for example, corresponds to the upper portion 51a of the outer member 51, rises from the upper face of the retaining portion 22, and protrudes upward. The upper face of the flange portion 21 corresponds to the upper face of the upper portion 51a of the outer member 51 and is in a higher position than an upper face of the retaining portion 22. A step is provided between the upper face of the flange portion 21 and the upper face of the retaining portion 22 and a height of the step is equal to the thickness of the upper portion 51a of the outer member 51. The upper face of the flange portion 21 is flat and parallel to the upper face and the lower face of the retaining portion 22. A length between the upper face of the flange portion 21 and the lower face of the retaining portion 22, i.e., the thickness of the inspection member 19 is equal to the depth of the recess 18a (FIG. 2).

(Method of Manufacturing the Vacuum Insulation Material)

A method of manufacturing the vacuum insulation material 6 will be described. However, an order of forming of the recess 18a, disposition of the inspection member 19, and housing of the inspection member 19 into the cover member 20 may be changed properly.

As shown in FIGS. 1 and 2, a laminated film is folded so that the innermost layers are positioned on an inner side, the innermost layers are heat-welded on two sides, and a bag of the cover member 20 is formed. Alternatively, two laminated films are layered so that the innermost layers are on an inner side, the innermost layers are heat-welded on three sides, and a bag of the cover member 20 is formed.

The inspection member 19 is disposed on the core member 18 and the inspection member 19 and the core member 18 are inserted into an internal space of the bag of the cover member 20. Then, by reducing the pressure of the internal space of the cover member 20 and closing an opening of the cover member 20, the vacuum insulation material 6 is manufactured.

At this time, as the pressure of the internal space in the cover member 20 is reduced, the inspection member 19 is pressed by the cover member 20 against the core member 18. As a result, the core member 18 is compressed by the inspection member 19 and the recess 18a along the inspection member 19 is formed in the core member 18. In this way, the inspection member 19 is fitted into the recess 18a and movement of the inspection member 19 is restricted. The lower face of the retaining portion 22 of the inspection member 19 comes in contact with the upper face of the core member 18 and the holes 23 in the retaining portion 22 communicate with the large number of minute spaces in the core member 18. When the inspection member 19 is fitted into the recess 18a, the upper face of the flange portion 21 becomes flush with the upper face of the core member 18a and the upper face of the vacuum insulation material 6 is formed to be flat. Furthermore, the cover member 20 covers the core member 18 and the inspection member 19 while coming in close contact with the surface of the core member 18 excluding the recess 18a, the upper face of the flange portion 21, and the upper face of the retaining portion 22. Here, there is the step between the upper face of the flange portion 21 and the upper face of the retaining portion 22 and therefore the step is also covered with the cover member 20. The cover member 20 on the holes 23 and the core member 18 are separated from each other by heights of the holes 23 and therefore do not come in contact with each other.

(Method of Measuring the Internal Pressure of the Vacuum Insulation Material)

Figure 5A:
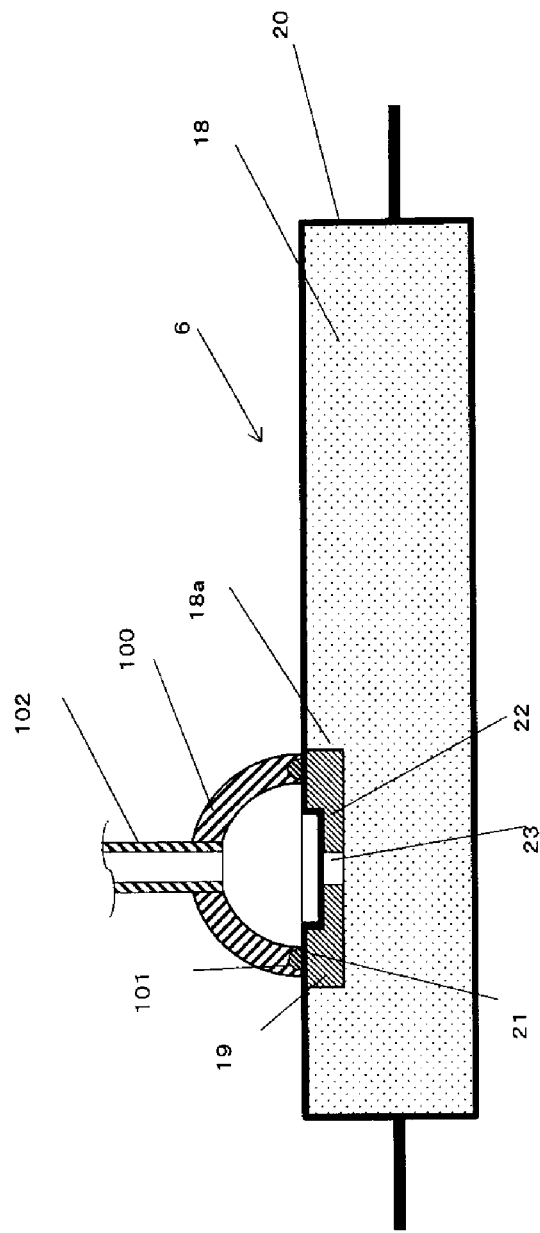
FIG. 5A is a sectional view showing a state in which a vacuum pad is placed against the vacuum insulation material in FIG. 1.

A method of measuring the internal pressure of the vacuum insulation material 6 will be described. FIG. 5A is a sectional view showing a state in which the vacuum pad 100 is placed against the vacuum insulation material 6. As shown in FIG. 5A, the vacuum pad 100 is in a cup shape having a space inside itself and packing 101 is attached to an annular opening end face of the vacuum pad 100. The packing 101 is the annular elastic member and has a diameter larger than an inside diameter of the flange portion 21 and smaller than an outside diameter of the flange portion 21. A suction pipe 102 is attached to the vacuum pad 100 in such a manner as to communicate with an inside of the vacuum pad 100 and a vacuum pump (not shown) is connected to the suction pipe 102.

First, the vacuum pad 100 is pushed against the cover member 20 of the vacuum insulation material 6 in such a manner that the packing 101 is aligned with the flange portion 21. At this time, the cover member 20 is in close contact with the upper face of the flat flange portion 21 and therefore it is possible to easily bring the vacuum pad 100 into close contact with the cover member 20 on the flange portion 21.

Then, if the vacuum pump is started, air inside the vacuum pad 100 is drawn through the suction pipe 102 and the pressure in the vacuum pad 100 is reduced. At this time, the packing 101 comes in close contact with the cover member 20 on the flange portion 21 to thereby prevent air or the like from flowing into the vacuum pad 100. In this way, the pressure in the vacuum pad 100 reduces as the vacuum pump draws the air and the pressure in the vacuum pad 100 is reduced to a value lower than a predetermined determination value, e.g., about 10 Pa while the pressure is measured.

As a pressure difference between the pressure in the vacuum pad 100 and the pressure (internal pressure) in the internal space of the vacuum insulation material 6 reduces as a result of reduction in the pressure in the vacuum pad 100, the cover member 20 is gradually deformed toward the vacuum pad 100. When the pressure in the vacuum pad 100 and the internal pressure of the vacuum insulation material 6 become equal to each other and the pressure difference becomes zero, the deformation of the cover member 20 becomes large. As the pressure in the vacuum pad 100 becomes smaller than the internal pressure of the vacuum insulation material 6 and the pressure difference increases, an amount of displacement of the cover member 20 increases. The pressure in the vacuum pad 100 is measured by using a known technique such as a pressure sensor provided to the suction pipe 102 and the amount of displacement of the cover member 20 is measured by a known technique such as a distance measuring sensor. Based on an inflection point (described later) on a curve representing the amount of displacement of the cover member 20 with respect to the pressure in the vacuum pad 100, the pressure in the vacuum pad 100 at the point when the deformation of the cover member 20 becomes large is obtained. Because the pressure is equal to the internal pressure of the vacuum insulation material 6, the internal pressure of the vacuum insulation material 6 can be obtained.

(Functions, Effect)

Because the opening of the vacuum pad 100 is covered with the inspection member 19 with the cover member 20 interposed therebetween, the pressure in the vacuum pad 100 acts on an outer face of the cover member 20 on the inspection member 19. Because the holes 23 in the inspection member 19 communicate with the internal space of the vacuum insulation material 6, the internal pressure of the vacuum insulation material 6 acts on an inner face of the cover member 20 through the holes 23. Therefore, when the pressure in the vacuum pad 100 is reduced and the internal pressure in the vacuum insulation material 6 becomes larger than the pressure in the vacuum pad 100, the internal pressure of the vacuum insulation material 6 acts on the cover member 20 through the holes 23. By this pressure, the cover member 20 is pushed and deformed toward the vacuum pad 100. At this time, the cover member 20 covers the upper face of the flange portion 21 and the upper face of the retaining portion 22 along the upper face of the retaining portion 22 recessed from the upper face of the flange portion 21 and therefore it is easy for the cover member 20 to move in such a direction as to protrude from the upper face of the retaining portion 22, i.e., toward the vacuum pad 100. As a result, the cover member 20 is displaced according to the pressure difference between the pressure in the vacuum pad 100 and the internal pressure of the vacuum insulation material 6. Moreover, the amount of displacement is larger as compared with a case without the step and therefore it is possible to accurately measure the internal pressure of the vacuum insulation material 6 based on the amount of displacement.

Because the core member 18 is supported by the lower face of the retaining portion 22, expansion and displacement of the core member 18 are prevented. Therefore, it is possible to suppress wrinkling and deformation of the inspection member 19 due to the deformation or displacement of the core member 18.

Especially, because the plurality of holes 23 are formed in the retaining portion 22, areas of the respective holes 23 can be reduced. Therefore, it is possible to more effectively prevent the deformation and the displacement of the core member 18. Moreover, the sum of the areas of the respective holes 23 can be increased and therefore the holes 23 can allow the internal pressure of the vacuum insulation material 6 to swiftly act on the cover member 20.

Furthermore, because the deformation and the displacement of the core member 18 are prevented, an amount of displacement of the core member 18 is not included in the amount of displacement of the cover member 20. As a result, it is possible to further accurately measure the internal pressure of the vacuum insulation material 6.

If the air is introduced into the vacuum pad 100 after the measurement of the internal pressure of the vacuum insulation material 6, the pressure in the vacuum pad 100 becomes larger than the internal pressure of the vacuum insulation material 6. As a result, the cover member 20 displaced toward the vacuum pad 100 is pushed toward the retaining portion 22 and the cover member 20 returns onto the upper face of the retaining portion 22. Even if fine wrinkles are formed on the cover member 20 when the cover member 20 returns, the upper face of the retaining portion 22 is lower than the upper face of the flange portion 21 and the upper face of the core member 18 and therefore the wrinkles do not protrude from the cover member 20 on the upper faces of the flange portion 21 and the core member 18. As a result, the entire upper face of the vacuum insulation material 6 does not have protruding portions and the upper face of the vacuum insulation material 6 can be brought in close contact with a flat housing or the like. Moreover, it is possible to prevent degradation of outward appearance of the vacuum insulation material 6 due to the wrinkles and deformation.

Furthermore, because the flange portion 21 of the inspection member 19 is circular, the flange portion 21 does not have a corner. Therefore, the cover member 20 is not damaged by the corner of the flange portion 21 and it is possible to prevent increase in the internal pressure of the vacuum insulation material 6 due to entry of the air.

MODIFICATION EXAMPLE 1

Figure 6:
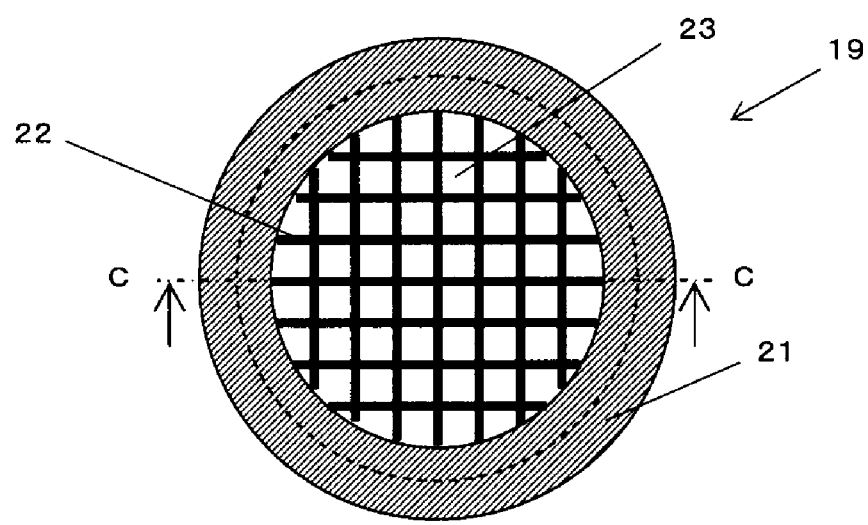
FIG. 6 is a plan view of an inspection member according to Modification Example 1.
Figure 7:
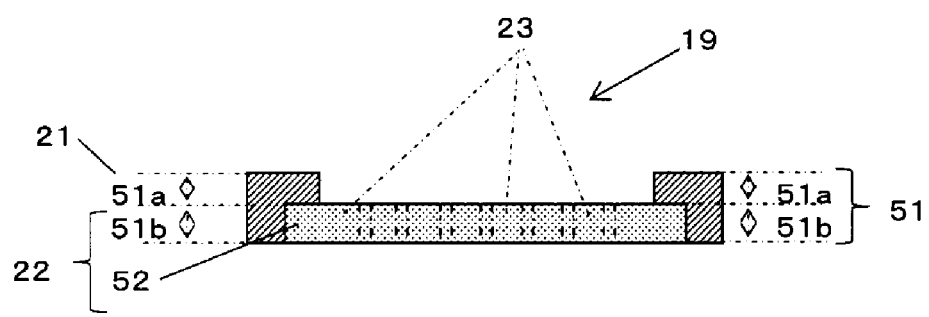
FIG. 7 is a sectional view of the inspection member cut along line C-C in FIG. 6.

FIG. 6 is a plan view of an inspection member 19. FIG. 7 is a sectional view of the inspection member 19 cut along line C-C in FIG. 6. The inspection member 19 shown in FIGS. 6 and 7 are similar to the inspection member 19 shown in FIGS. 3 and 4 except the inner member 52.

An inner member 52 is a lattice-shaped flat plate and is in a circular shape. When the inner member 52 is fitted into a lower portion 51b of an outer member 51, a large number of holes 23 appear in spaces in the lattice of the retaining portion 22 on an inner side of an upper portion 51a of the outer member 51. These holes 23 are disposed symmetrically with respect to a center of the flange portion 21.

EXAMPLE 1

By using the inspection member 19 shown in FIGS. 3 and 4, glass wool for a core member 18, and laminated films for a cover member 20, a vacuum insulation material 6 according to Example 1 was formed according to the above-described method of manufacturing the vacuum insulation material 6.

To put it concretely, an inspection member was disposed on the glass wool. As the glass wool, there was used glass wool not subjected to hot pressing or binder bonding and having a basis weight of 2000 g/m², a width of 175 mm, and a length of 280 mm. As the inspection member, there was used a combination of an outer member having an outer diameter of 50 mm, an inner diameter of 40 mm, and a thickness of 3 mm and made of polyacetal resin and an inner member having a hole of an outer diameter of 8 mm and an outer diameter of 45 mm and a thickness of 1.5 mm and made of stainless steel.

Next, while the glass wool was sandwiched between stainless plates in a thickness direction, the glass wool was inserted into a bag of the laminated films. As the bag of the laminated films, there was used a bag formed by layering two laminated films each having a width of 250 mm and a length of 400 mm so that heat weld layers of the films faced each other and heat-welding the films on three sides. As the laminated film, there was used a film formed by layering a heat weld layer made of a low-density polyethylene film having a thickness of 50 μm, a gas barrier layer made of an aluminum foil having a thickness of 7 μm, and a protecting layer made of a polyethylene terephthalate film having a thickness of 12 μm and a nylon film having a thickness of 15 μm in order and bonding the layers with a dry laminate adhesive.

Figure 5B:
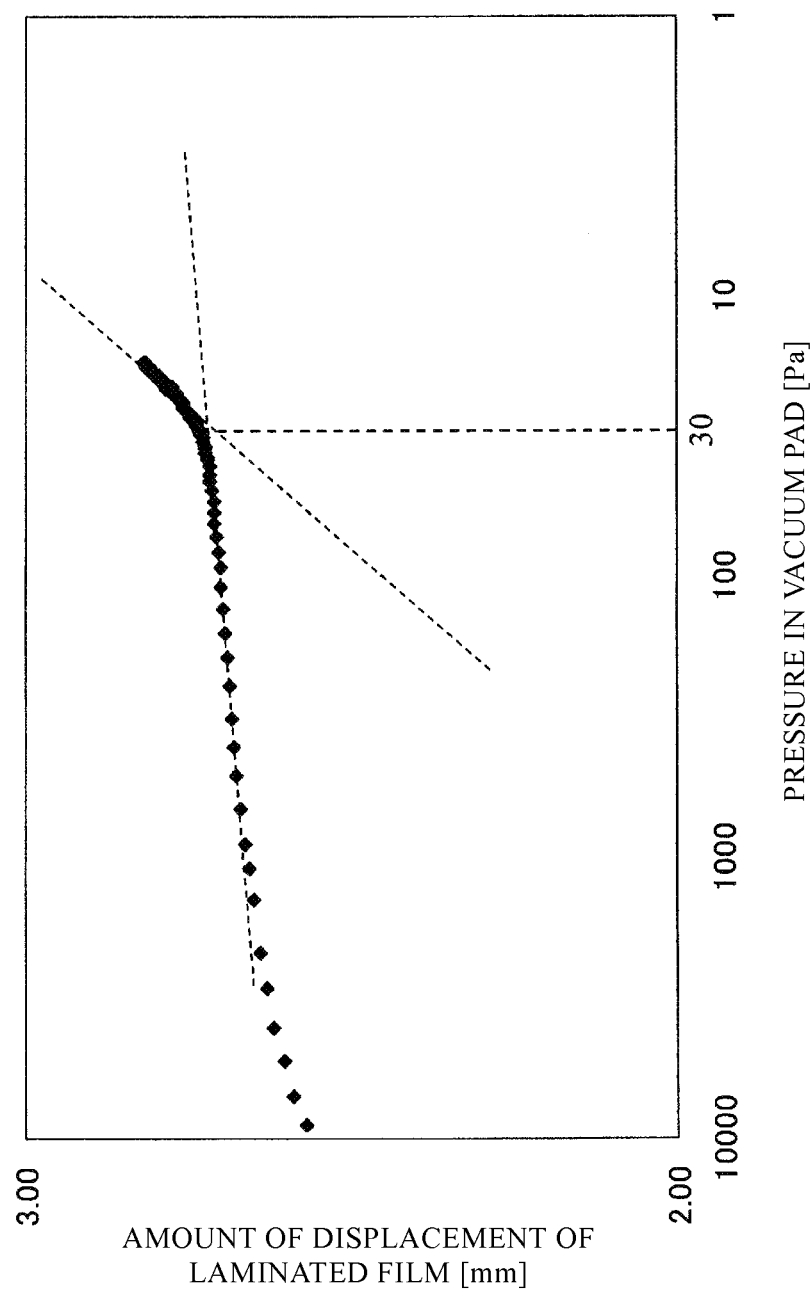
FIG. 5B is a graph showing a relationship between an amount of displacement of a laminated film in Example 1 and pressure in the vacuum pad.

Then, while sandwiching the glass wool housed in the bag of the laminated films between iron plates in the thickness direction and compressing the glass wool so that the thickness of the glass wool became 10 mm, the pressure in the bag of the laminated films was reduced. Then, by sealing an opening of the bag of the laminated films, the vacuum insulation material was formed. As the stainless steel plates, flat plates each having a width of 200 mm, a length of 450 mm, and a thickness of 0.5 mm were used The internal pressure of the vacuum insulation material of Example 1 formed as described above was measured according to the above-described method of measuring the internal pressure of the vacuum insulation material. As a result, a relationship between pressure in a vacuum pad 100 and an amount of displacement of the laminated film shown in FIG. 5B was obtained. Based on an inflection point on a curve of the amount of displacement of the laminated film with respect to the pressure in the vacuum pad 100, the internal pressure of the vacuum insulation material was found to be about 30 Pa.

When an outward appearance of the vacuum insulation material was observed after the air was introduced into the vacuum pad 100 after the measurement of the internal pressure, wrinkles on the laminated film and deformation of the vacuum insulation material were not found.

EXAMPLE 2

By using the inspection member 19 shown in FIGS. 6 and 7, glass wool for a core member 18, and laminated films for a cover member 20, a vacuum insulation material 6 according to Example 2 was formed according to the above-described method of manufacturing the vacuum insulation material 6. The vacuum insulation material 6 of Example 2 was similar to the vacuum insulation material 6 of Example 1 except that the inspection member of Modification Example 1 shown in FIGS. 6 and 7 was used as the inspection member. As the inspection member, there was used a combination of an outer member having an outer diameter of 50 mm, an inner diameter of 40 mm, and a thickness of 3 mm and made of polypropylene resin and an inner member having an outer diameter of 45 mm and a thickness of 1.5 mm and made of stainless steel.

Figure 8:
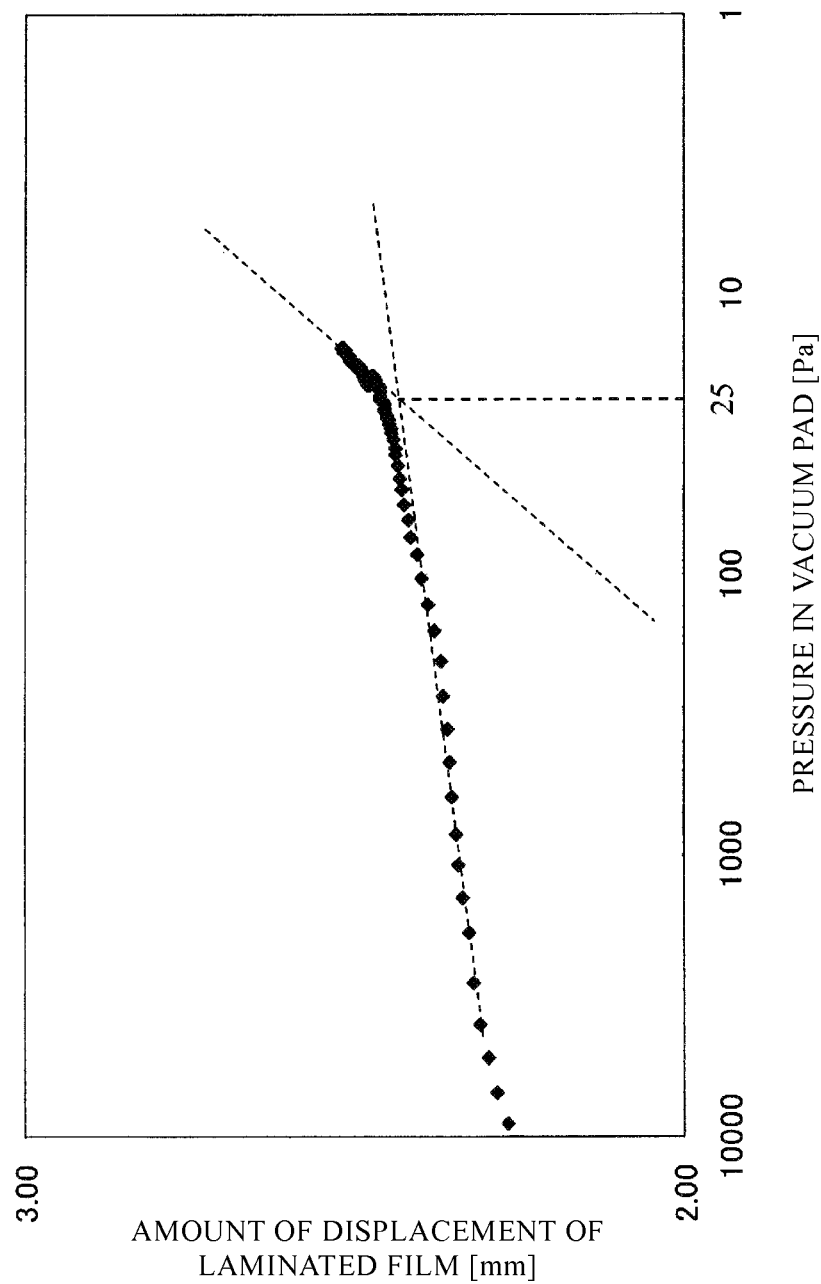
FIG. 8 is a graph showing a relationship between an amount of displacement of a laminated film in Example 2 and pressure in a vacuum pad.

The internal pressure of the vacuum insulation material of Example 2 was measured according to the above-described method of measuring the internal pressure of the vacuum insulation material. As a result, a relationship between pressure in a vacuum pad 100 and an amount of displacement of the laminated film shown in FIG. 8 was obtained. Based on an inflection point on a curve of the amount of displacement of the laminated film with respect to the pressure in the vacuum pad 100, the internal pressure of the vacuum insulation material was found to be about 25 Pa.

When an outward appearance of the vacuum insulation material was observed after the air was introduced into the vacuum pad 100 after the measurement of the internal pressure, wrinkles on the laminated film and deformation of the vacuum insulation material were not found.

COMPARATIVE EXAMPLE 1

Without using an inspection member and without compressing a cover member, into which glass wool was inserted, with iron plates, a vacuum insulation material of Comparative Example 1 was formed. Except that, manufacture of the vacuum insulation material of Comparative Example 1 is similar to that of Example 1. In measurement of the internal pressure of the vacuum insulation material of Comparative Example 1, a vacuum pad 100 was not used and a vacuum chamber was used.

To put it concretely, the entire vacuum insulation material of Comparative Example 1 was put into the vacuum chamber, the pressure in the vacuum chamber was reduced, and the pressure in the vacuum chamber and an amount of displacement of the laminated film were measured. No inflection point was found on a curve of the amount of displacement of the laminated film with respect to the pressure in the vacuum chamber and the internal pressure of the vacuum insulation material could not be measured. This is thought to be caused by an amount of displacement due to expansion of glass wool which was larger than the amount of displacement of the cover member.

Moreover, many wrinkles were formed on the vacuum insulation material taken out of the vacuum chamber. This is thought to be caused by the glass wool which expanded and returned to an original state not uniformly but non-uniformly when pressure changed from reduced pressure to normal pressure because the cover member into which the glass wool was inserted was not compressed with the iron plates.

(Embodiment 2)

Figure 9:
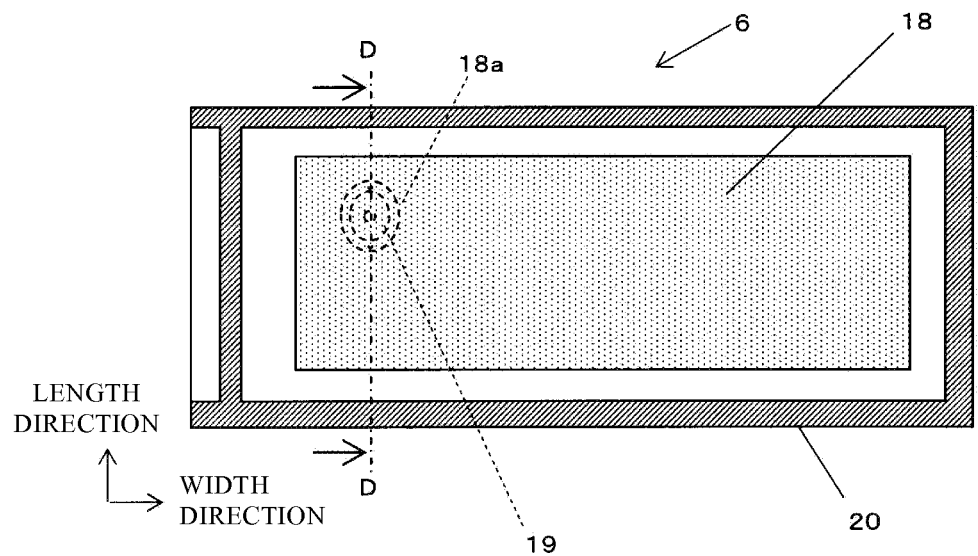
FIG. 9 is a plan view of a vacuum insulation material according to Embodiment 2 of the invention.
Figure 10:
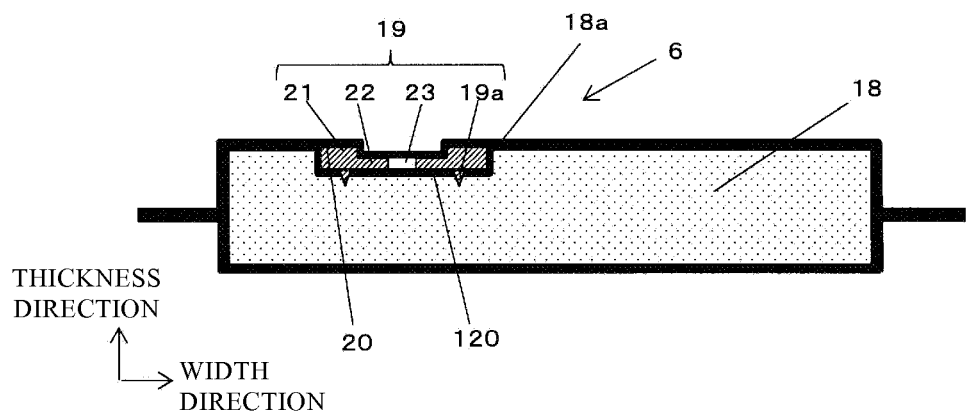
FIG. 10 is a sectional view of the vacuum insulation material cut along line D-D in FIG. 9.

FIG. 9 is a plan view of a vacuum insulation material 6 according to Embodiment 2. FIG. 10 is a sectional view of the vacuum insulation material 6 cut along line D-D in FIG. 9. As shown in FIGS. 9 and 10, except an inspection member 19 and an inner bag 120, the vacuum insulation material 6 according to Embodiment 2 is similar to the vacuum insulation material 6 according to Embodiment 1. Length and width directions shown in FIGS. 9 and 10 indicate directions of a core member 18 of the vacuum insulation material 6. The core member 18 of the vacuum insulation material 6 has a substantially rectangular parallelepiped shape having a larger dimension in the width direction than in the length direction and a larger dimension in the length direction than in a thickness direction.

The inner bag 120 is a member for covering the core member 18 so as to facilitate insertion of the core member 18 into a cover member 20 and is formed by a film or the like. However, if the core member 18 is in such a shape as to facilitate insertion into the cover member 20 due to compression or forming, the inner bag 120 may not be provided.

The inner bag 120 may be in a bag shape with an open side or in a tube shape with two open sides. With the inspection member 19 disposed on the inner bag 120 covering the core member 18 and the inner bag 120 open in the cover member 20, all of them are covered with the cover member 20. In this way, through the opening(s), pressure in minute spaces in the core member 18 (internal pressure of the vacuum insulation material 6) and pressure in a hole 23 in the inspection member 19 are equalized to each other. Moreover, the cover member 20 pushes the inspection member 19 toward the core member 18 when the pressure in the cover member 20 is reduced and therefore protruding portions 19a (described later) of the inspection member 19 may break the inner bag 120. As a result, the inner bag 120 open near the hole 23 and a difference between the internal pressure of the vacuum insulation material 6 and the pressure in the hole 23 becomes less liable to occur.

Figure 11:
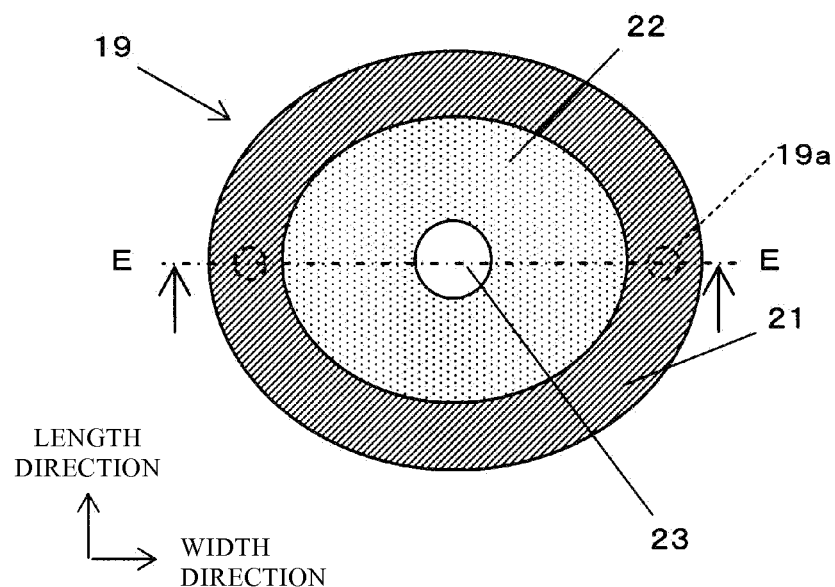
FIG. 11 is a plan view of an inspection member provided to the vacuum insulation material in FIG. 9.
Figure 12:
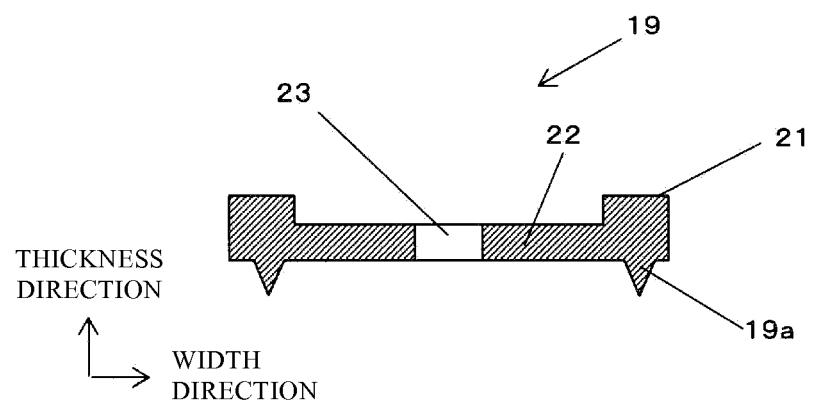
FIG. 12 is a sectional view of the inspection member cut along line E-E in FIG. 11.

FIG. 11 is a plan view of the inspection member 19. FIG. 12 is a sectional view of the inspection member 19 cut along line E-E in FIG. 11. As shown in FIGS. 11 and 12, the inspection member 19 is in a shape, e.g., an oval shape, having a smaller dimension in a length direction perpendicular to a thickness direction than in a width direction perpendicular to the thickness direction and the length direction. Furthermore, the one hole 23 is provided at a center of an upper face of a retaining portion 22. An outer member 51 and an inner member 52 are formed integrally. In this way, it is possible to save trouble of respectively preparing the outer member 51 and the inner member 52 and assembling them, which is excellent in cost and workability. Furthermore, because a flange portion 21 functions as a rib of the retaining portion 22, the retaining portion 22 is reinforced by the flange portion 21 in the thickness direction. As a result, warp or the like of the retaining portion 22 can be suppressed and the retaining portion 22 can further reliably prevent displacement of the core member 18.

The inspection member 19 includes, in addition to the retaining portion 22, the hole 23, and the flange portion 21, one or a plurality of (two, in the present embodiment) protruding portion(s) 19a. The protruding portions 19a protrude downward from a lower face of the retaining portion 22 and the two protruding portions 19a are disposed symmetrically with respect to a center of the flange portion 21.

In this vacuum insulation material 6, as shown in FIG. 9, the oval inspection member 19 is disposed on the core member 18 in such a manner that the length direction corresponds to the width direction of the core member 18 and the width direction corresponds to the length direction of the core member 18. In this case, because the length of the inspection member 19 is short while the width of the core member 18 is long, a proportion of the inspection member 19 to the width of the core member 18 can be small and the width of the core member 18 can be larger. On the other hand, it is also possible to dispose the oval inspection member 19 on the core member 18 in such a manner that the length direction corresponds to the length direction of the core member 18 and that the width direction corresponds to the width direction of the core member 18. In this case, because the length of the inspection member 19 is short, a proportion of the inspection member 19 to the length direction of the core member 18 can be small and the length of the core member 18 can be larger. Therefore, even if there is a pipe at a place where the vacuum insulation material 6 is to be disposed, it is possible to dispose the vacuum insulation material 6 in such a manner that the pipe is not disposed above the inspection member 19 to thereby increase a degree of freedom in disposition of the vacuum insulation material 6.

As shown in FIG. 10, the protruding portions 19a of the inspection member 19 are biting into the core member 18. As a result, the inspection member 19 becomes less liable to move with respect to the core member 18 and therefore it is possible to appropriately dispose the inspection member 19 at a predetermined position of the vacuum insulation material 6. Moreover, because the protruding portions 19a extend in the thickness direction, they prevent the core member 18 from moving in a direction perpendicular to the thickness direction. As a result, in measurement of the internal pressure of the vacuum insulation material 6, the protruding portions 19a can suppress deformation and displacement of the core member 18.

EXAMPLE 3

By using the inspection member 19 shown in FIGS. 11 and 12, glass wool for a core member 18, and laminated films for a cover member 20, a vacuum insulation material 6 according to Example 3 was formed according to the above-described method of manufacturing the vacuum insulation material 6.

To put it concretely, glass wool was inserted into an inner bag and the glass wool was inserted into a bag of the laminated films while the pressure in the inner bag was reduced. As the inner bag, there was used a bag formed by heat-welding two low-density polyethylene films each having a width of 230 mm and a length of 350 mm on three sides. As the bag of the laminated films, there was used a bag formed by layering two laminated films each having a width of 300 mm and a length of 400 mm so that heat weld layers of the films faced each other and heat-welding the films on three sides. The laminated films were similar to those used in Example 1.

In the bag of the laminated films, the inspection member was disposed on the inner bag. As the inspection member, there was used a member with a flange portion having an outer diameter of 50 mm, an inner diameter of 40 mm, and a thickness of 3 mm and with a hole of an outer diameter of 5 mm and made of MC nylon resin.

Then, while sandwiching the glass wool housed in the bag of the laminated films between iron plates in the thickness direction and compressing the glass wool so that the thickness of the glass wool became 10 mm, the pressure in the bag of the laminated films was reduced. Then, by sealing an opening of the bag of the laminated films, the vacuum insulation material was formed.

Figure 13:
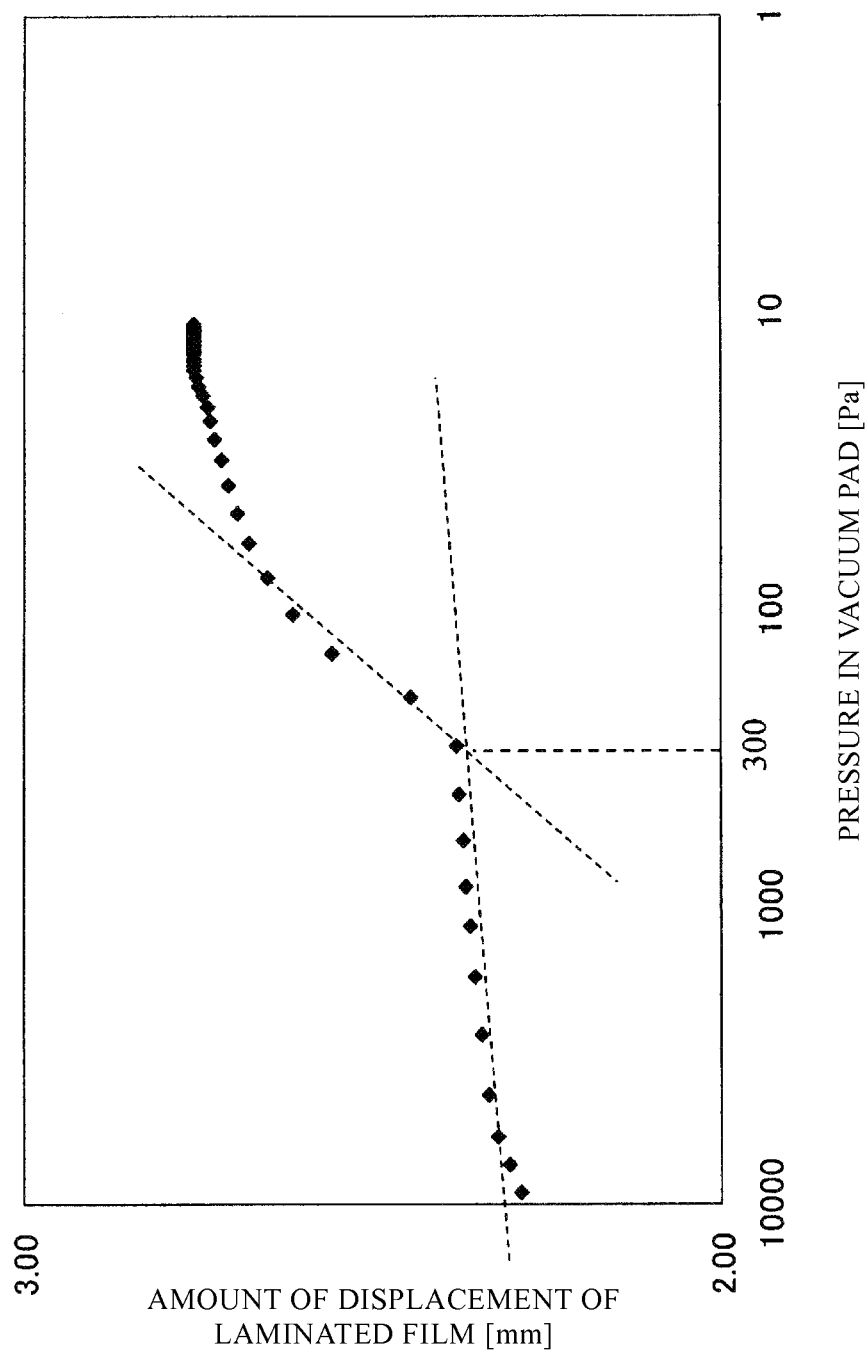
FIG. 13 is a graph showing a relationship between an amount of displacement of a laminated film in Example 3 and pressure in a vacuum pad.

The internal pressure of the vacuum insulation material of Example 3 formed as described above was measured according to the above-described method of measuring the internal pressure of the vacuum insulation material. As a result, a relationship between pressure in a vacuum pad 100 and an amount of displacement of the laminated film shown in FIG. 13 was obtained. Based on an inflection point on a curve of the amount of displacement of the laminated film with respect to the pressure in the vacuum pad 100, the internal pressure of the vacuum insulation material was found to be about 300 Pa.

When an outward appearance of the vacuum insulation material was observed after the air was introduced into the vacuum pad 100 after the measurement of the internal pressure, wrinkles on the laminated film and deformation of the vacuum insulation material were not found.

COMPARATIVE EXAMPLE 2

Without using an inspection member and without compressing a cover member, into which glass wool was inserted, with iron plates, vacuum insulation material of Comparative Example 2 was formed. Except that, manufacture of the vacuum insulation material of Comparative Example 2 is similar to that of Example 3. In measurement of the internal pressure of the vacuum insulation material of Comparative Example 1, a vacuum pad 100 was not used and a vacuum chamber was used.

The entire vacuum insulation material of Comparative Example 2 was put into the vacuum chamber, the pressure in the vacuum chamber was reduced, and the pressure in the vacuum chamber and an amount of displacement of the laminated film were measured. No inflection point was found on a curve of the amount of displacement of the laminated film with respect to the pressure in the vacuum chamber and the internal pressure of the vacuum insulation material could not be measured. This is thought to be caused by an amount of displacement due to expansion of glass wool which was larger than the amount of displacement of the cover member.

Moreover, many wrinkles were formed on the vacuum insulation material taken out of the vacuum chamber. This is thought to be caused by the glass wool which expanded and returned to an original state not uniformly but non-uniformly when pressure changed from reduced pressure to normal pressure because the cover member into which the glass wool was inserted was not compressed with the iron plates.

(Embodiment 3)

Figure 14:
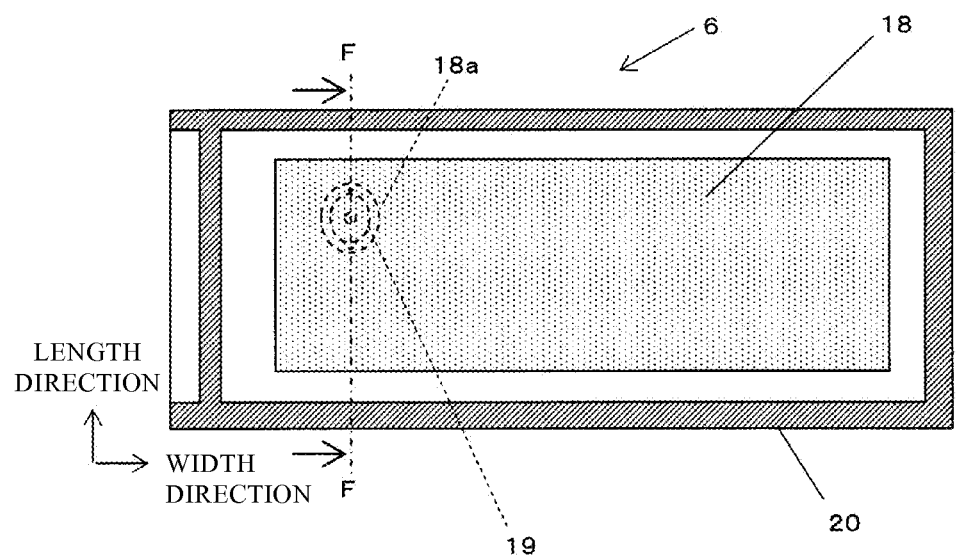
FIG. 14 is a plan view of a vacuum insulation material according to Embodiment 3 of the invention.
Figure 15:
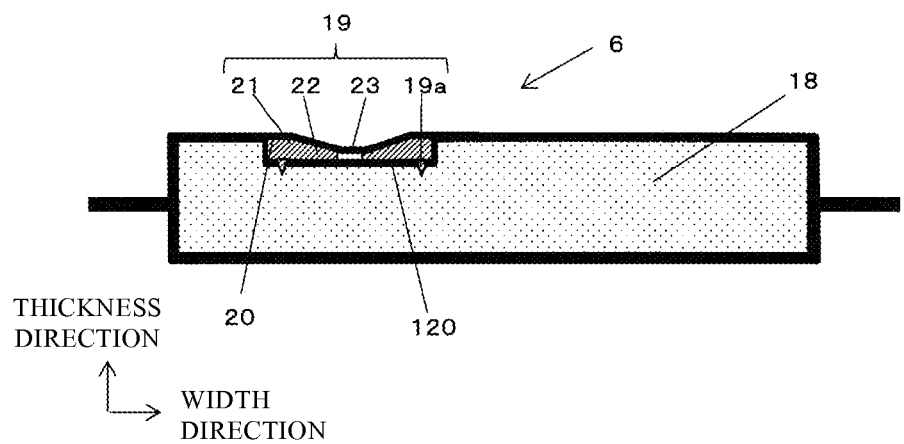
FIG. 15 is a sectional view of the vacuum insulation material cut along line F-F in FIG. 14.

FIG. 14 is a plan view of vacuum insulation material 6 according to Embodiment 3. FIG. 15 is a sectional view of the vacuum insulation material 6 cut along line F-F in FIG. 14. As shown in FIGS. 14 and 15, except an inspection member 19, the vacuum insulation material 6 according to Embodiment 3 is similar to the vacuum insulation material 6 according to Embodiment 2.

Figure 16:
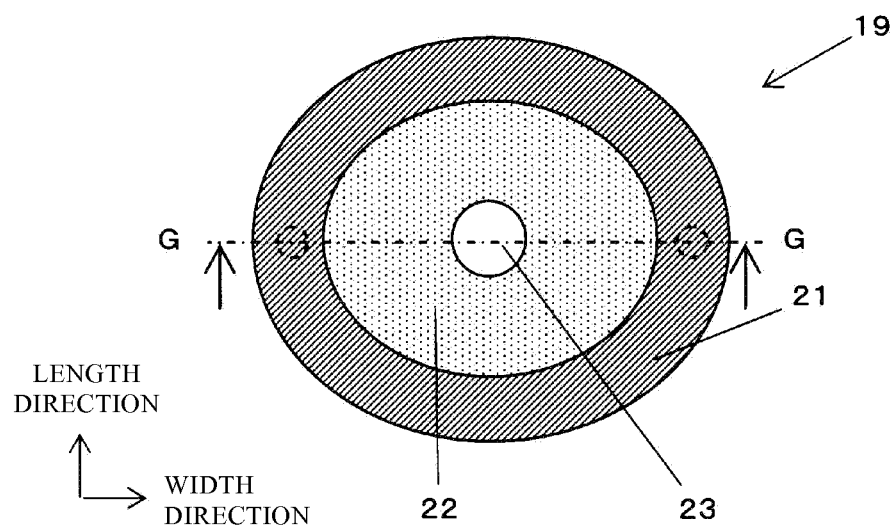
FIG. 16 is a plan view of an inspection member provided to the vacuum insulation material in FIG. 14.
Figure 17:
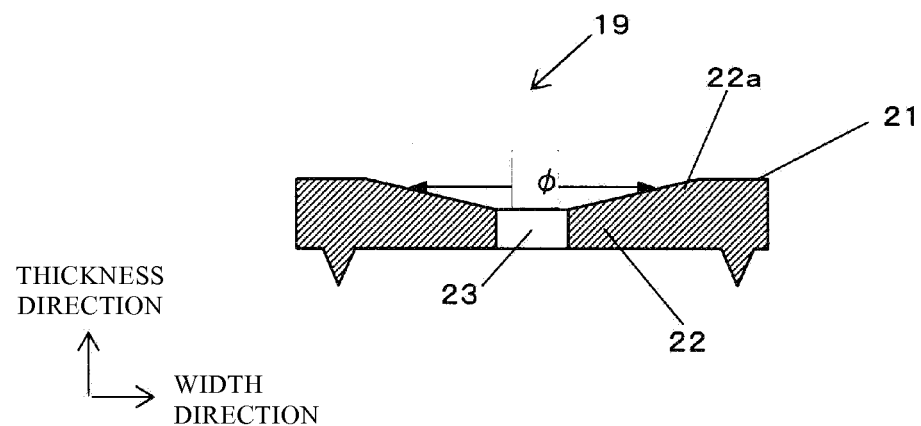
FIG. 17 is a sectional view of the inspection member cut along line G-G in FIG. 16.

FIG. 16 is a plan view of the inspection member 19. FIG. 17 is a sectional view of the inspection member 19 cut along line G-G in FIG. 16. As shown in FIGS. 16 and 17, the inspection member 19 according to Embodiment 3 is similar to the inspection member 19 according to Embodiment 2 except a shape of an upper face of a retaining portion 22.

The retaining portion 22 includes a tapered portion 22a sloping so that an inside diameter $\phi$ increases from a center toward a flange portion 21. At the tapered portion 22a, the upper face of the retaining portion 22 slopes symmetrically with respect to the center of the retaining portion 22 and extends straight. Therefore, an angle between the upper face of the retaining portion 22 and an upper face of the flange portion 21 is large and an edge between the upper faces is not angular and has an obtuse angle. In this way, when a cover member 20 comes in close contact with the upper face of the retaining portion 22 and the upper face of the flange portion 21, it is possible to reduce pressure locally acting on the edge between the upper faces to thereby prevent plastic deformation of the cover member 20.

The cover member 20 covers the tapered portion 22a where the upper face of the retaining portion 22 is recessed from the upper face of the flange portion 21. Therefore, when the pressure in the vacuum pad 100 is reduced in measurement of internal pressure of the vacuum insulation material 6 by using a vacuum pad 100, the cover member 20 is liable to move in a protruding direction, i.e., toward the vacuum pad 100. As a result, the cover member 20 is displaced according to a pressure difference between the pressure in the vacuum pad 100 and the internal pressure of the vacuum insulation material 6. Moreover, because an amount of displacement is larger as compared with a case without a step, it is possible to accurately measure the internal pressure of the vacuum insulation material 6 based on the amount of displacement.

EXAMPLE 4

By using the inspection member 19 shown in FIGS. 16 and 17, glass wool for a core member 18, and laminated films for a cover member 20, a vacuum insulation material 6 of Example 4 was formed according to the above-described method of manufacturing the vacuum insulation material 6. The vacuum insulation material 6 of Example 4 is similar to the vacuum insulation material 6 of Example 3 except that the inspection member shown in FIGS. 16 and 17 was used as the inspection member 19. As the inspection member, there was used a member including a flange portion 21 having an outer diameter of 60 mm, an inner diameter of 50 mm, and a thickness of 3 mm and a hole 23 having an outer diameter of 3 mm and made of Duracon resin.

Figure 18:
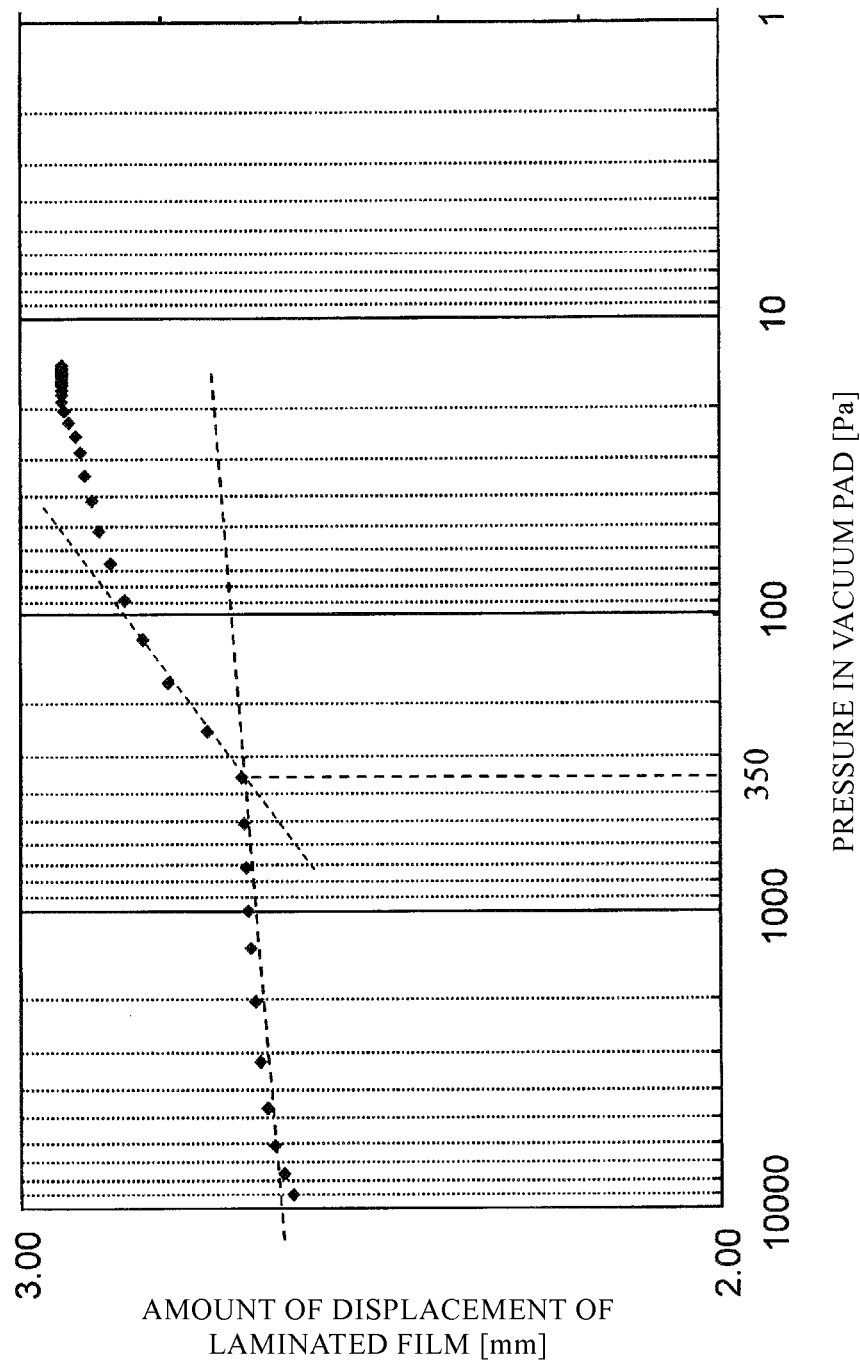
FIG. 18 is a graph showing a relationship between an amount of displacement of a laminated film in Example 4 and pressure in a vacuum pad.

The internal pressure of the vacuum insulation material of Example 4 was measured according to the above-described method of measuring the internal pressure of the vacuum insulation material. As a result, a relationship between pressure in a vacuum pad 100 and an amount of displacement of the laminated film shown in FIG. 18 was obtained. Based on an inflection point on a curve of the amount of displacement of the laminated film with respect to the pressure in the vacuum pad 100, the internal pressure of the vacuum insulation material was found to be about 350 Pa.

When an outward appearance of the vacuum insulation material was observed after the air was introduced into the vacuum pad 100 after the measurement of the internal pressure, wrinkles on the laminated film and deformation of the vacuum insulation material were not found.

COMPARATIVE EXAMPLE 3

Without using an inspection member and without compressing a cover member, into which glass wool was inserted, with iron plates, a vacuum insulation material of Comparative Example 3 was formed. Except that, manufacture of the vacuum insulation material of Comparative Example 2 is similar to that of Example 3. In measurement of the internal pressure of the vacuum insulation material of Comparative Example 1, a vacuum pad 100 was not used and a vacuum chamber was used.

The entire vacuum insulation material of Comparative Example 3 was put into the vacuum chamber, the pressure in the vacuum chamber was reduced, and the pressure in the vacuum chamber and an amount of displacement of the laminated film were measured. No inflection point was found on a curve of the amount of displacement of the laminated film with respect to the pressure in the vacuum chamber and the internal pressure of the vacuum insulation material could not be measured. This is thought to be caused by an amount of displacement due to expansion of glass wool which was larger than the amount of displacement of the cover member.

Moreover, many wrinkles were formed on the vacuum insulation material taken out of the vacuum chamber. This is thought to be caused by the glass wool which expanded and returned to an original state not uniformly but non-uniformly when pressure changed from reduced pressure to normal pressure because the cover member into which the glass wool was inserted was not compressed with the iron plates.

MODIFICATION EXAMPLE 2

Figure 19A:
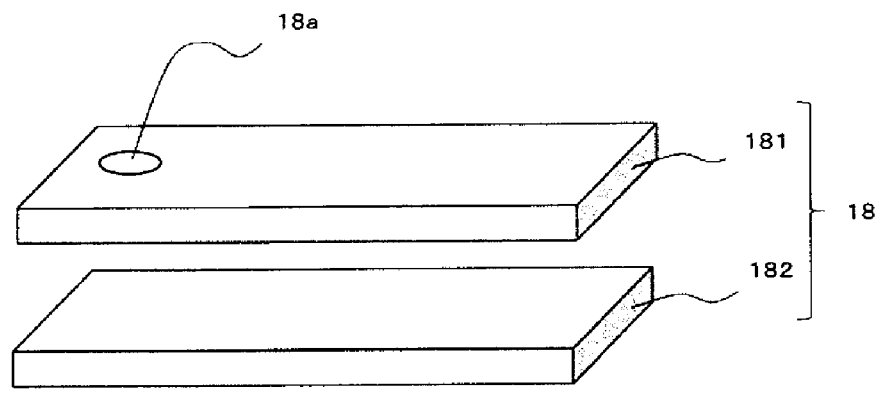
FIG. 19A is a perspective view of a core member in Modification Example 2.

Although the core member 18 was formed by a single formed body in Embodiments 1 to 3, a core member 18 may be formed by layered bodies 181 and 182 formed by layering a plurality of (two, here) thin core member layers in a thickness direction as shown in FIG. 19A. In this case, a recess 18a may be formed by cutting and penetrating one or a plurality of upper layer(s) 181 out of the plurality of core member layers 181 and 182.

MODIFICATION EXAMPLE 3

Figure 19B:
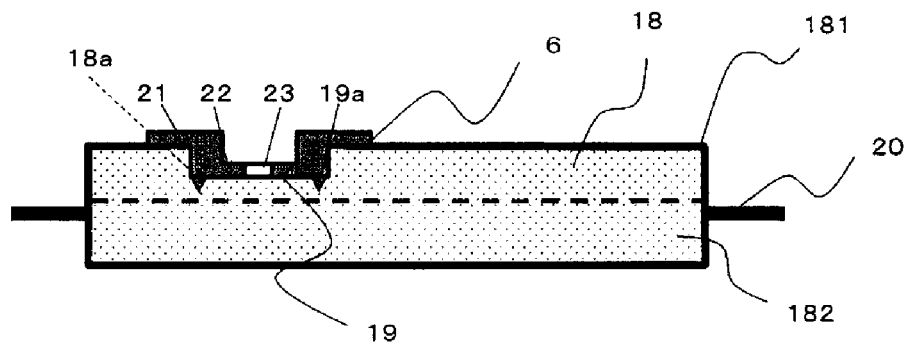
FIG. 19B is a sectional view of a vacuum insulation material on which an inspection member in Modification Example 3 is disposed.

In Embodiments 1 to 3, the flange portion 21 may extend outward from the retaining portion 22 in such a manner that a diameter of the flange portion 21 increases. For example, as shown in FIG. 19B, a retaining portion 22 is housed in a recess 18a and a flange portion 21 is placed on a surface of the core member 18 in this case.

MODIFICATION EXAMPLE 4

Although the flange portion 21 of the inspection member 19 is in the circular or oval shape in Embodiments 1 to 3, the flange portion 21 may be in a polygonal shape such as a rectangle. In this way, if a length and a width of a rectangular flange portion 21 are the same as those of the flange portion 21 in the circular shape or the like, a perimeter of the rectangular flange portion 21 is longer than that of the flange portion 21 in the circular shape or the like. Therefore, a contact area between a vacuum pad 100 and a cover member 20 on the flange portion 21 increases, which improves measurement accuracy of internal pressure of vacuum insulation material 6.

(Embodiment 4)

Figure 20:
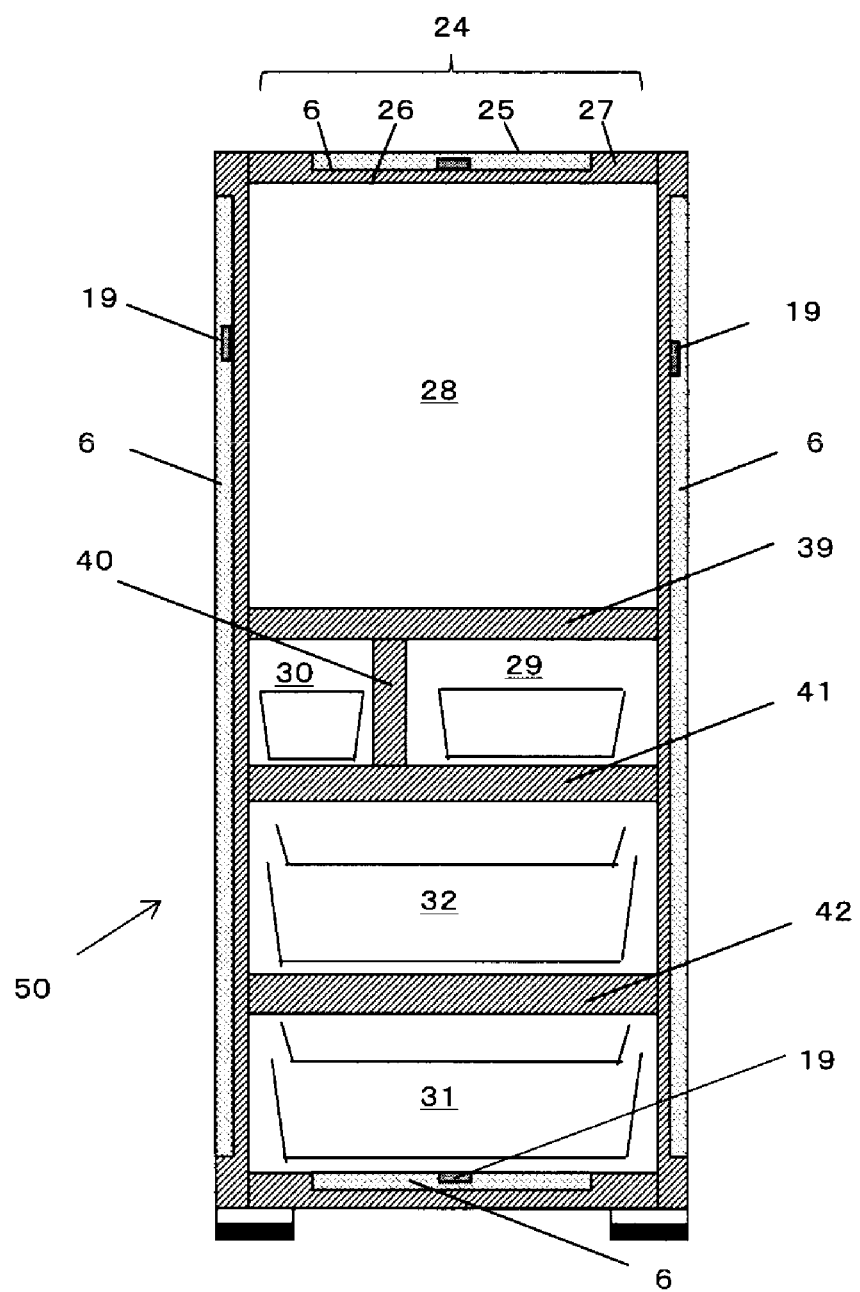
FIG. 20 is a sectional view of a refrigerator according to Embodiment 4 of the invention and cut parallel to a front face.
Figure 21:
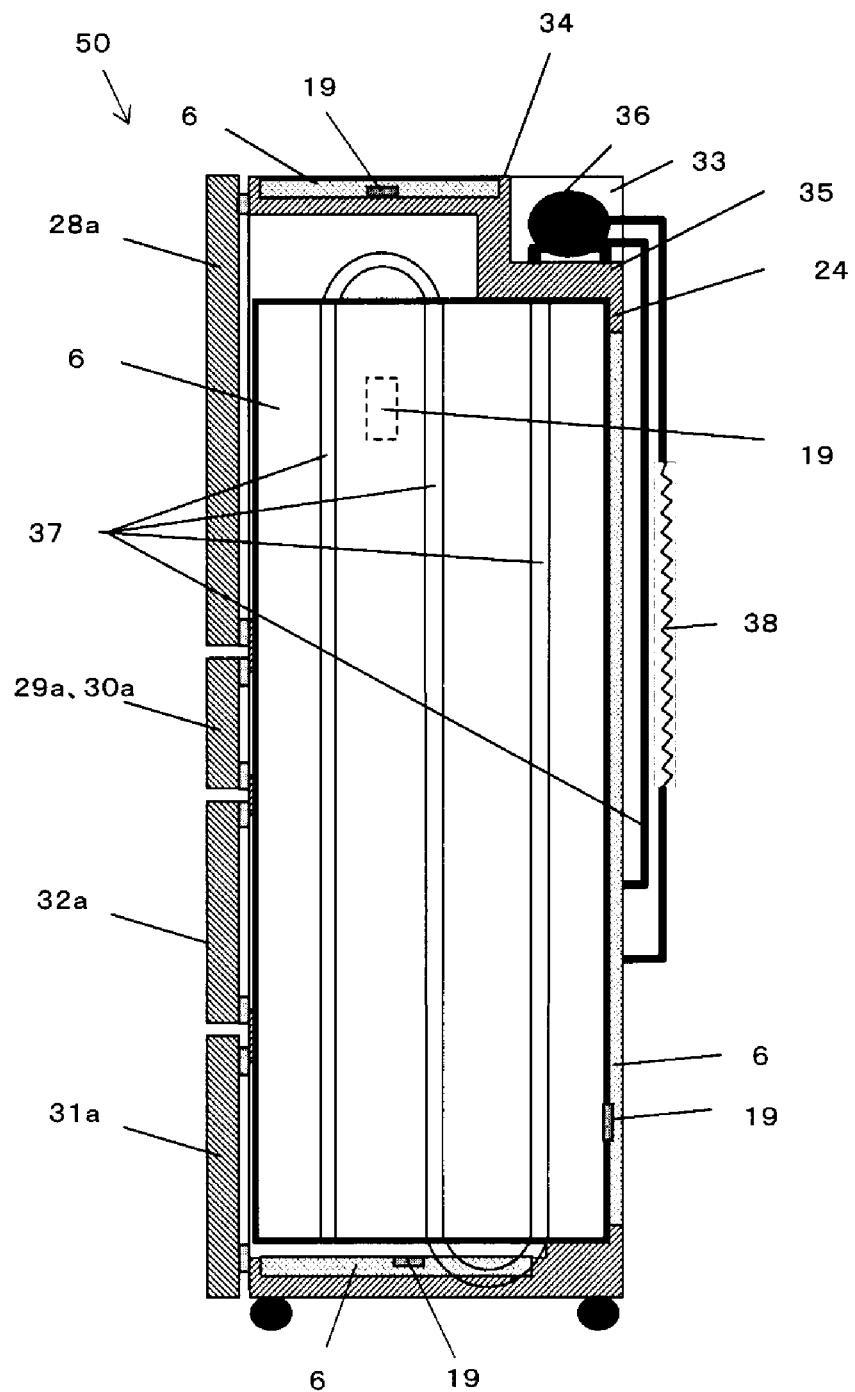
FIG. 21 is a sectional view of the refrigerator in FIG. 20 and cut perpendicularly to the front face.

A refrigerator using the vacuum insulation material 6 according to any one of Embodiments 1 to 3 will be described. FIG. 20 is a sectional view schematically showing the refrigerator 50 according to Embodiment 4 and cut parallel to a front face. FIG. 21 is a sectional side view schematically showing the refrigerator 50 cut perpendicularly to the front face. As shown in FIGS. 20 and 21, the refrigerator 50 is formed by a heat insulation housing 24 having heat insulated spaces in itself and doors 28a, 29a, 30a, 31a, and 32a mounted to the heat insulation housing 24 so as to be able to open and close the heat insulated spaces. For convenience of explanation, a face of the heat insulation housing 24 to which the doors 28a, 29a, 30a, 31a, and 32a are mounted is referred to as a front face and a face facing the front face is referred to as a back face.

The heat insulation housing 24 is formed by an inner box 26 and an outer box 25 provided on an outer side of the inner box 26. The inner box 26 is a wall portion forming an inner face of the heat insulation housing 24 defining the heat insulated space and is formed by vacuum forming of resin such as ABS. The outer box 25 is a wall portion forming an outer face of the heat insulation housing 24 and is made of metal material such as an iron plate. The inner box 26 and the outer box 25 have rectangular parallelepiped shapes open on a front side and the outer box 25 is formed to be larger than the inner box 26. The inner box 26 is disposed in the outer box 25 with a clearance formed between an outer face of the inner box 26 and an inner face of the outer box 25. In the space between the inner box 26 and the outer box 25, the vacuum insulation material 6 is disposed and heat insulation body 27 is integrally foamed and filled. In this way, the heat insulation housing 24 formed by the inner box 26, the outer box 25, the vacuum insulation material 6, and the heat insulation body 27 is formed integrally. As the heat insulation body 27, foamed plastic such as rigid urethane foam, phenol foam, and styrene foam is used, for example.

The vacuum insulation material 6 is stuck to the inner face of the outer box 25 excluding a bottom face of the heat insulation housing 24 with adhesive tape or the like. On the bottom face of the heat insulation housing 24, the vacuum insulation material 6 is stuck to the outer face of the inner box 26 with the adhesive tape or the like. Because the vacuum insulation material 6 has the inspection member 19, the vacuum insulation material 6 is not deformed or wrinkled after the measurement of the internal pressure. Therefore, the vacuum insulation material 6 can come in close contact with the outer box 25 and the inner box 26 without leaving clearances and blocks heat transfer from the air outside the outer box 25 to the heat insulated space.

Figure 22:
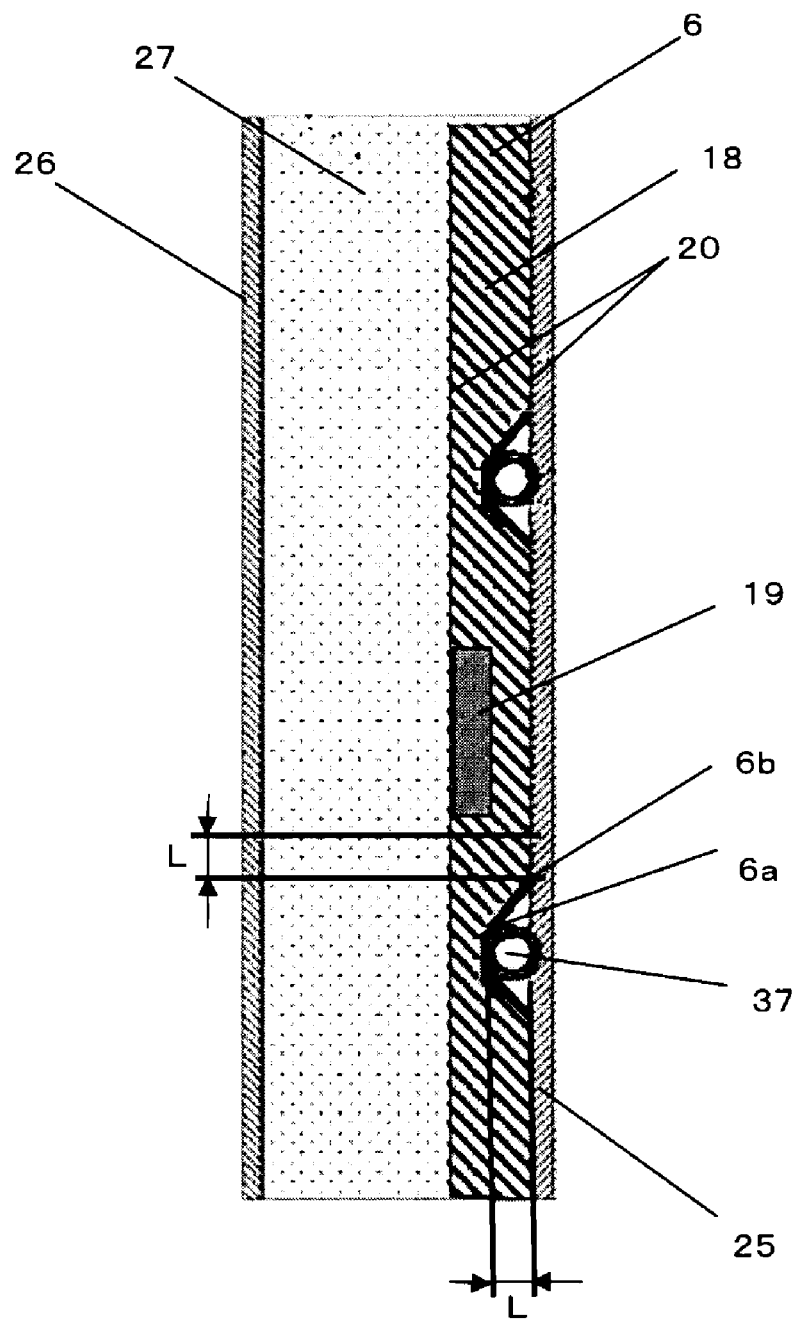
FIG. 22 is an enlarged sectional view of a portion of the refrigerator in FIG. 20.

Although the vacuum insulation material 6 has a rectangular parallelepiped shape having flat surfaces, the vacuum insulation material 6 may have a shape conforming to a shape with which the vacuum insulation material 6 comes in contact. For example, as shown in FIG. 22, a radiator pipe 37 (piping) (described later) is disposed on an inner face of an outer box 25 and vacuum insulation material 6 is stuck onto the inner face of the outer box 25 with the radiator pipe 37 interposed therebetween in some cases. In such a case, a groove 6a (concave portion) is formed in the surface of the vacuum insulation material 6 and the vacuum insulation material 6 is disposed on the outer box 25 in such a manner that the radiator pipe 37 is fitted into the groove 6a. In this way, the radiator pipe 37 is housed in the vacuum insulation material 6 and the vacuum insulation material 6 other than the groove 6a can come in close contact with the outer box 25.

The groove 6a is formed by roll pressing, in which a roll having a shape corresponding to the groove 6a is rotated, after decompression-sealing the inside of the cover member 20 into which the core member 18 and the inspection member 19 are housed. If a plurality of grooves 6a are provided, adjacent grooves 6a are disposed away from each other. The cover member 20 is stretched by the groove 6a and a thickness of the cover member 20 is reduced and the stretch and the change in the thickness depend on a depth L of the groove 6a. Therefore, by setting a distance between end portions 6b of the adjacent grooves 6a to a distance longer than or equal to the depth L of the groove 6a, the stretch and the change in the thickness of the cover member 20 caused by the groove 6a becomes less likely to affect the adjacent groove 6a and it is possible to suppress reduction in durability of the cover member 20 caused by the grooves 6a.

The inspection member 19 is disposed at a distance longer than or equal to the depth L of the groove 6a from the end portion 6b of the groove 6a. In this way, the stretch and the change in the thickness of the cover member 20 caused by the groove 6a becomes less likely to affect the cover member 20 above the inspection member 19. Therefore, the cover member 20 is displaced according to change in pressure in a vacuum pad 100 (FIG. 5A) and it is possible to accurately measure the internal pressure of the vacuum insulation material 6.

Furthermore, the inspection member 19 is disposed at a center between the adjacent grooves 6a. In this way, it is possible to prevent greater stretch and change in the thickness of the cover member 20 from being caused by the groove 6a at one of the grooves 6a with respect to the inspection member 19. As a result, force uniformly acts on the cover member 20 with respect to a center of the inspection member 19 and therefore it is possible to accurately measure the internal pressure of the vacuum insulation material 6.

The heat insulation housing 24 has a vertically-long substantially rectangular parallelepiped shape open on a front side and has the heat insulated space in itself. The heat insulated space is partitioned into a plurality of (five, in the present embodiment) heat insulated space portions 28, 29, 30, 31, and 32 by one or a plurality of (four, in the present embodiment) partition(s) 39, 40, 41, and 42. The five heat insulated space portions 28, 29, 30, 31, and 32 are positioned at four vertical levels and the second heat insulated space portion from the top is further divided into two in a left-right direction. For example, the first heat insulated space portion from the top is used as a refrigerating compartment 28, the two second heat insulated space portions from the top are used as an upper freezing compartment 29 and an ice-making compartment 30, and the third heat insulated space portion is used as a lower freezing compartment 32, and the fourth heat insulated space portion is used as a vegetable compartment 31. Temperature sensors (not shown) are disposed in all or parts of the heat insulated space portions 28, 29, 30, 31, and 32.

The five doors 28a, 29a, 30a, 31a, and 32a are mounted to the heat insulation housing 24 in the embodiment so as to cover front faces of the respective heat insulated space portions 28, 29, 30, 31, and 32 in the heat insulation housing 24 to be able to open and close the front faces and the doors 28a, 29a, 30a, 31a, and 32a are formed by sticking facing boards to insulation material such as foamed polystyrene. Gaskets are disposed between the respective doors 28a, 29a, 30a, 31a, and 32a and the heat insulation housing 24 to thereby maintain airtightness of the respective heat insulated space portions 28, 29, 30, 31, and 32.

In the heat insulation housing 24, a cooling compartment (not shown) is provided behind the partitions 40 and 41 and the lower freezing compartment 32. In the cooling compartment, a cooler (not shown) is disposed to be long in a vertical direction. The cooler is made of material such as aluminum and copper with good heat conductivity and a fin and tube type cooler is used, for example.

A cool air blower fan (not shown) is disposed near (e.g., in a space above) the cooler and blows air cooled by the cooler 43 respectively into the refrigerating compartment 28, the ice-making compartment 30, the upper freezing compartment 29, the lower freezing compartment 32, and the vegetable compartment 31 by a forced convection method. A radiant heater (not shown) is provided in a space below the cooler and removes frost attached to the cooler and the cool air blower fan during cooling. The defroster is not limited to the radiant heater and a pipe heater or the like in close contact with the cooler may be used.

The heat insulation housing 24 is provided with a machine compartment 33 formed by recessing respective parts of a back face and a top face of the heat insulation housing 24. Therefore, the top face of the heat insulation housing 24 is formed by a first top face portion 34 and a second top face portion 35 recessed from the first top face portion 34. In the machine compartment 33, a compressor 36 is disposed on the second top face portion 35. On a side face and the back face of the heat insulation housing 24, a dryer (not shown) for removing moisture, a capacitor (not shown), radiator pipes 37 for heat radiation, a capillary tube 38, and the cooler (not shown) are disposed. The compressor 36, the dryer, the capacitor, the radiator pipes 37, the capillary tube 38, and the cooler are connected in this order in an annular shape to form a freezing cycle. As a refrigerant circulating through the freezing cycle, R600a which is the flammable refrigerant is used in order to protect the environment. A controller (not shown) is provided to the heat insulation housing 24 and controls respective components of the freezing cycle based on detection values or the like from temperature sensors.

Next, operation of the freezing cycle in the above-described refrigerator 50 will be described. The controller starts and stops cooling operation based on detection signals from the respective temperature sensors. When the cooling operation is started, the refrigerant is compressed in the compressor 36, increased in temperature and pressure, and sent into the radiator pipes 37. The high-temperature and high-pressure refrigerant in the form of a gas is cooled in the radiator pipes 37 by the air or the heat insulation body 27 and condensed to a liquid. The pressure of the condensed refrigerant is reduced in the capillary tube 38 and the refrigerant reduced in temperature and pressure reaches the cooler. Here, the low-temperature refrigerant in the cooler exchanges heat with surrounding air to be warmed and vaporized and returns into the compressor 36 through the radiator pipes 37. On the other hand, the surrounding air is cooled by the cooler and the cool air is blown by the cool air blower fan into the respective heat insulated space portions 28, 29, 30, 31, and 32 in the refrigerator to cool the inside of the refrigerator. When the temperature of the temperature sensor becomes equal to or lower than a stop temperature, the operation of the compressor 36 is stopped.

According to this heat insulation housing 24 of the refrigerator 50, the inspection member 19 is disposed on the upper face side of the vacuum insulation material 6 and the grooves 6a are formed on the lower face side. In this way, even if the cover member 20 is wrinkled or the core member 18 is deformed on the lower face side of the vacuum insulation material 6, wrinkles and deformation are not caused on the upper face side. As a result, the cover member 20 is displaced according to the pressure difference between the pressure in the vacuum pad 100 and the internal pressure of the vacuum insulation material 6 and therefore it is possible to accurately measure the internal pressure.

Even after the lower face of the vacuum insulation material 6 is stuck to the outer box 25 or the inner box 26, the upper face of the vacuum insulation material 6 is appearing on the outside before the outer box 25 is covered with the inner box 26. Therefore, it is possible to measure the internal pressure of the vacuum insulation material 6 by using the inspection member 19 disposed on the upper face side of the vacuum insulation material 6. Especially, because it is possible to easily measure the internal pressure of the vacuum insulation material 6 by using the vacuum pad 100 (FIG. 5A), the internal pressure of not only the vacuum insulation material 6 as a separate item but also the vacuum insulation material 6 during a manufacturing process of the refrigerator 50 can be measured, if it is necessary to maintain low internal pressure.

MODIFICATION EXAMPLE 5

Although the grooves 6a are formed in the vacuum insulation material 6 in Embodiment 4, the groove 6a does not necessarily have to be provided. In this case, a length or a width of the vacuum insulation material 6 is set to be smaller than an interval between the adjacent radiator pipes 37 disposed on the outer box 25. In this way, it is possible to dispose the vacuum insulation material 6 between the adjacent radiator pipes 37.

OTHER MODIFICATION EXAMPLES

In Embodiment 4, a groove 6a may be provided on an upper face side of a vacuum insulation material 6 on which an inspection member 19 is disposed. In this case, by forming the groove 6a away from the inspection member 19, it is possible to suppress influences of deformation and wrinkles of a core member 18 and a cover member 20 caused by the groove 6a on displacement of the cover member 20 on the inspection member 19. As a result, a degree of freedom in layout of the groove 6a and the inspection member 19 can be increased.

In Embodiment 4, a groove 6a may not be formed by roll pressing afterward. For example, by forming a concave portion in a core member 18 in advance, and decompression-sealing the inside of the cover member 20 into which the core member 18 is housed, it is possible to form a groove corresponding to the concave portion in the vacuum insulation material 6.

Although the vacuum insulation material 6 is used for the heat insulation housing 24 of the refrigerator 50 in Embodiment 4, the use of the vacuum insulation material 6 is not limited to it. For example, the vacuum insulation material 6 may be used for heat insulation walls (heat insulation housings) of vending machines, houses, trains, ships, and the like.

In each of the embodiments, the flange portion 21 may not be provided to the inspection member 19. In this way, an inspection member 19 is formed into a shape of a flat plate by a retaining portion 22 and an outer peripheral edge portion of the retaining portion 22 performs a function of a flange portion.

All of the above-described embodiments may be combined with each other unless they are mutually exclusive.

From the above description, many improvements and other embodiments of the invention are apparent to a person skilled in the art. The above description should be understood as examples and are provided for the purpose of teaching the best modes for carrying out the invention to the person skilled in the art. Details of the structures and/or functions of the invention can be substantially changed without departing from the spirit of the invention.

INDUSTRIAL APPLICABILITY

The vacuum insulation material and the heat insulation housing according to the invention are useful as the vacuum insulation material and the heat insulation housing and the like with which the internal pressure of the vacuum insulation material can be measured while deformation of the core member is suppressed.

REFERENCE SIGNS LIST 6 vacuum insulation material
6a groove (concave portion)
18 core member
18a recess
19 inspection member
19a protruding portion
20 cover member
21 flange portion
22 retaining portion
22a tapered portion
23 hole
24 heat insulation housing
25 outer box (wall portion)
26 inner box (wall portion)

The invention claimed is:

1. A vacuum insulation material comprising:
   a core member including a large number of minute spaces;
   a cover member having an internal space in which the core member is housed, the internal space being decompression-sealed; and
   an inspection member provided between the core member and the cover member,
   wherein the inspection member includes
   a retaining portion disposed on the core member,
   a hole formed in the retaining portion and
   a flange portion that protrudes from an upper face of the retaining portion toward the cover member and continuously surrounds a periphery of the hole.

2. The vacuum insulation material according to claim 1, wherein the flange portion is integrally formed with the retaining portion.

3. The vacuum insulation material according to claim 1, wherein the flange portion has a rectangular or circular shape when seen from a side of the upper face.

4. The vacuum insulation material according to claim 1, wherein the inspection member further includes a protruding portion protruding from a lower face of the retaining portion toward the core member.

5. The vacuum insulation material according to claim 1, wherein the retaining portion includes a tapered portion formed by sloping the upper face of the retaining portion toward an upper face of the flange portion.

6. The vacuum insulation material according to claim 1, wherein the inspection member has a shape with a smaller dimension in a length direction perpendicular to a thickness direction than a dimension in a width direction perpendicular to the thickness direction and the length direction.

7. The vacuum insulation material according to claim 1,
   wherein the plurality of holes are formed in the retaining portion and
   the plurality of holes are disposed symmetrically with respect to a center of the flange portion.

8. The vacuum insulation material according to claim 1,
   wherein the core member includes a recess having a surface lower than a surrounding surface and
   the inspection member is fitted in the recess.

9. The vacuum insulation material according to claim 8, wherein the recess is formed by cutting out or compressing the core member.

10. The vacuum insulation material according to claim 8,
    wherein the core member is a laminated body formed by laminating a plurality of core member layers and
    the recess is formed by cutting an upper layer out of the plurality of core member layers.

11. The vacuum insulation material according to claim 1, wherein the core member further includes a concave portion formed in an opposite face from the face provided with the inspection member.

12. A heat insulation housing comprising
    the vacuum insulation material according to claim 1 and
    a wall portion on which the vacuum insulation material is disposed.

13. The heat insulation housing according to claim 12, wherein the vacuum insulation material is disposed on the wall portion so that an opposite face from a face provided with the inspection member comes in contact with the wall portion.

14. The heat insulation housing according to claim 12, wherein at least one of a length and a width of the vacuum insulation material is smaller than an interval between adjacent pipes disposed on the wall portion.

* * * * *